(12) United States Patent
Avinash

(10) Patent No.: US 12,524,459 B1
(45) Date of Patent: Jan. 13, 2026

(54) ARTIFICIAL INTELLIGENCE-BASED IMAGE SEARCH REFINEMENT

(71) Applicant: DeepMind Technologies Limited, London (GB)

(72) Inventor: Aditya Avinash, Santa Clara, CA (US)

(73) Assignee: DEEPMIND TECHNOLOGIES LIMITED, London (GB)

( * ) Notice: Subject to any disclaimer, the term of this patent is extended or adjusted under 35 U.S.C. 154(b) by 0 days.

(21) Appl. No.: 18/925,948

(22) Filed: Oct. 24, 2024

(51) Int. Cl.
*G06F 16/535* (2019.01)
*G06F 16/2457* (2019.01)
*G06F 16/538* (2019.01)

(52) U.S. Cl.
CPC ...... *G06F 16/535* (2019.01); *G06F 16/24578* (2019.01); *G06F 16/538* (2019.01)

(58) Field of Classification Search
CPC . G06F 16/24578; G06F 16/535; G06F 16/538
See application file for complete search history.

(56) References Cited

U.S. PATENT DOCUMENTS

| | | | | |
|---|---|---|---|---|
| 2015/0169631 | A1* | 6/2015 | Gu | G06F 16/50 707/723 |
| 2018/0276495 | A1* | 9/2018 | Yu | G06V 20/20 |
| 2021/0118211 | A1* | 4/2021 | Ansari | G06N 5/02 |
| 2024/0125609 | A1* | 4/2024 | Husain | G01C 21/3647 |
| 2024/0378236 | A1* | 11/2024 | Kharbanda | G06F 16/33295 |

* cited by examiner

*Primary Examiner* — Jay A Morrison
(74) *Attorney, Agent, or Firm* — DORITY & MANNING P.A.

(57) ABSTRACT

Systems and methods for image search result filtering can include obtaining a search query, determining a plurality of candidate image search results, processing the search query with a generative model to determine a plurality of search result criteria, and refining the plurality of candidate image search results based on determining whether the candidate results satisfy the plurality of search results criteria. The systems and methods can perform a plurality of determinations based on the output of the generative model.

19 Claims, 25 Drawing Sheets

GENERATE VARIOUS REAL WORLD SCENARIOS THEN GENERATE LOOKUP QUERIES OF EACH SCENARIO.

552 — USER QUERY
"I'M LOOKING FOR IMAGES OF A DOG WEARING A RED BANDANA, SITTING IN A PARK ON A SUNNY DAY."

554 — REAL WORLD SCENARIOS
TYPICAL IN-SCOPE IMAGES:
- A GOLDEN RETRIEVER WITH A VIBRANT RED BANDANA TIED AROUND ITS NECK, SEATED CALMLY ON A LUSH GREEN GRASS PATCH IN A PARK, BATHED IN THE WARM SUNLIGHT OF A CLEAR DAY.
- A SMALL TERRIER MIX WITH A RED BANDANA, SITTING ATTENTIVELY ON A PARK BENCH UNDER A BRIGHT, SUNNY SKY. OTHER PARK ELEMENTS, SUCH AS TREES AND FLOWERS, ARE VISIBLE IN THE BACKGROUND.
- A BLACK LABRADOR, WITH A RED BANDANA LOOSELY TIED AROUND ITS NECK, SITTING IN A GRASSY AREA OF A PARK, WITH SUNBEAMS ILLUMINATING ITS FUR AND THE SURROUNDING GREENERY.
- A MEDIUM-SIZED MIXED BREED DOG WITH A RED BANDANA, HAPPILY SITTING ON A GRASSY KNOLL IN A PARK. THE SKY IS A CLEAR, BRIGHT BLUE WITH FLUFFY WHITE CLOUDS, AND THE SUNLIGHT CASTS A WARM GLOW ON THE SCENSE.
- ......

556 — RETRIEVAL LOOKUP QUERIES

GOLDEN RETRIEVER RED BANDANA PARK    BLACK LAB RED BANDANA PARK GRASS    TERRIER RED BANDANA PARK BENCH

558 — IMAGES RETRIEVED

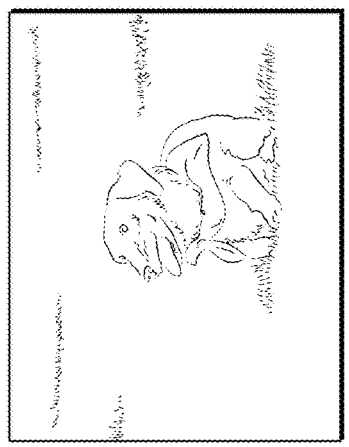

ARTIFICIAL INTELLIGENCE-BASED IMAGE SEARCH REFINEMENT

FIELD

The present disclosure relates generally to image search result refinement. More particularly, the present disclosure relates to leveraging an artificial intelligence agent to perform image search result refinement using query processing and computer vision.

BACKGROUND

Traditional search techniques can struggle with obtaining image search results that are responsive to a complex query, such as a query that includes multiple objects and/or relative spatial relationships between object(s). Additionally, queries requesting actions and/or settings may cause further difficulties for traditional search techniques. The search results generated by the traditional search techniques may satisfy only a portion of the request or may include a mix of relevant results and irrelevant results.

Moreover, traditional search systems can struggle with long and/or complex queries. For example, traditional search systems may not have a large enough token window, may struggle with understanding relationships between query terms, and/or may weight terms in such a way that certain results are penalized despite including all requested objects.

SUMMARY

Aspects and advantages of embodiments of the present disclosure will be set forth in part in the following description, or can be learned from the description, or can be learned through practice of the embodiments.

One example aspect of the present disclosure is directed to a computing system for image search. The system can include one or more processors and one or more non-transitory computer-readable media that collectively store instructions that, when executed by the one or more processors, cause the computing system to perform operations. The operations can include obtaining a search query. The search query can include one or more inputs requesting image data including one or more particular feature sets. The operations can include determining a plurality of candidate image search results based on the search query. The operations can include processing the search query with a generative model to generate a plurality of search result criteria. The operations can include processing, for at least a subset of the plurality of candidate image search results, a respective candidate image search result of the plurality of candidate image search results to determine a plurality of scores associated with the plurality of search result criteria. The operations can include determining a plurality of respective search result rankings of the plurality of candidate image search results based on each of the plurality of scores. The operations can include providing a refined image search results list for display in response to determining the plurality of respective search result rankings of the plurality of candidate image search results based on each of the plurality of scores.

In some implementations, determining the plurality of candidate image search results based on the search query can include processing the search query with an embedding model to generate a query embedding and determining the plurality of candidate image search results based on a plurality of embedding space distances between the query embedding and a plurality of image embeddings. The plurality of search result criteria can include a set of objects that are determined to be requested based on the generative model processing the search query.

In some implementations, determining the plurality of candidate image search results based on the search query can include processing the search query to generate a plurality of short-form queries and determining a plurality of candidate image result sets based on searching each of the plurality of short-form queries. In some implementations, determining the plurality of candidate image search results based on the search query can include processing the search query with the generative model to generate a narrative output descriptive of a scenario in which the one or more particular feature sets would be present and processing the narrative output with a search engine to determine the plurality of candidate image search results. The narrative output can include one or more complete natural language sentences. The generative model can include an autoregressive language model. The generative model can include a multimodal generative model configured to process multimodal data.

In some implementations, processing, for at least the subset of the plurality of candidate image search results, the respective candidate image search result of the plurality of candidate image search results to determine the plurality of scores associated with the plurality of search result criteria can include processing the plurality of candidate image search results with an auto-rater configured for low-latency rating. The auto-rater can perform a plurality of binary classifications with one or more classifiers, then evaluates the respective candidate image search result based on the plurality of binary classifications. Processing the search query with the generative model to generate the plurality of search result criteria can include processing the search query with the generative model to generate a binary criteria list descriptive of features that are requested by the search query. The plurality of respective search result rankings can be determined based on whether respective candidate image search results satisfy list items of the binary criteria list.

In some implementations, the generative model can include a router model trained to interact with external tools and determine a next task in performing search query response processing. The generative model can include a language model trained to understand query intent, multiple languages, misspellings, and typographical errors. Determining the plurality of candidate image search results based on the search query can include obtaining between 80 to 250 candidate image search results. Determining the plurality of respective search result rankings of the plurality of candidate image search results based on each of the plurality of scores can include filtering the plurality of candidate image search results based on the plurality of scores.

Another example aspect of the present disclosure is directed to a computer-implemented method for image search. The method can include obtaining, by a computing system including one or more processors, a search query. The search query can include one or more inputs requesting image data including one or more particular objects and one or more particular actions. The method can include determining, by the computing system, a plurality of candidate image search results and a plurality of respective search result rankings based on the search query. The method can include processing, by the computing system, the search query with a generative model to generate a plurality of search result criteria. The plurality of search result criteria can be descriptive of the one or more particular objects and the one or more particular actions. The method can include, for at least a subset of the plurality of candidate image search results, processing, by the computing system and based on the plurality of search result criteria, a respective candidate image search result of the plurality of candidate image search results with one or more machine-learned classification models to perform a plurality of classifications associated with the plurality of search result criteria. The method can include adjusting, by the computing system, the plurality of respective search result rankings of the plurality of candidate image search results based on each of the plurality of classifications. The method can include providing, by the computing system, a refined image search results list for display in response to adjusting the plurality of respective search result rankings of the plurality of candidate image search results based on each of the plurality of classifications. The refined image search results list can include a set of image search results that includes classifications descriptive of the plurality of search result criteria being met.

In some implementations, the plurality of search result criteria can include a set of binary logic strings. The plurality of respective search result rankings can be determined based at least in part on historical click data associated with respective results of the plurality of candidate image search results when previous queries associated with similar topics are received. The generative model may have been tuned on ground truth satisfactory labels provided during feedback training loops. In some implementations, processing, by the computing system, the search query with the generative model to generate the plurality of search result criteria can include processing, by the computing system, the search query with the generative model to generate a model-generated ranking rubric for evaluating the plurality of candidate image search results. The generative model can be configured to generate the plurality of search result criteria and to communicate with a plurality of classification models to perform the plurality of classifications. Outputs of the plurality of classifications can be transmitted back to the generative model to perform rankings adjustments.

Another example aspect of the present disclosure is directed to one or more non-transitory computer-readable media that collectively store instructions that, when executed by one or more computing devices, cause the one or more computing devices to perform operations. The operations can include obtaining a search query. The search query can include one or more inputs requesting image data including a plurality of particular feature sets. The operations can include determining a plurality of candidate image search results and a plurality of respective search result rankings based on the search query. The operations can include processing the search query, the plurality of candidate image search results, and the plurality of respective search result rankings with a generative model to determine a refined set of image search results. In some implementations, processing the search query, the plurality of candidate image search results, and the plurality of respective search result rankings with a generative model to determine the refined set of image search results can include processing the search query with a generative model to generate a routing output including a plurality of search result criteria and a plurality of routing calls for interfacing with a plurality of different classification models associated with different criteria of the plurality of search result criteria; interfacing, based on the plurality of routing calls, with the plurality of different classification models to perform a plurality of classifications for each of the plurality of candidate image search results; and processing the plurality of candidate image search results, the plurality of search result criteria, and each of the plurality of classifications to generate the refined set of image search results descriptive of a subset of the plurality of candidate image search results that comprise the plurality of particular feature sets. The operations can include providing the refined set of image search results for display in a graphical search results interface.

In some implementations, the operations can include storing the search query and the refined set of image search results as a training example and training an embedding model based at least in part on the training example comprising the search query and the refined set of image search results. Determining the plurality of candidate image search results and the plurality of respective search result rankings based on the search query can include performing, based on the search query, a search of an image corpus based on metadata of a plurality of database images. In some implementations, determining the plurality of candidate image search results and the plurality of respective search result rankings based on the search query can include processing the search query with the generative model to generate a plurality of sub-task queries and determining the plurality of candidate image search results by processing each of the plurality of sub-task queries.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5B depicts an illustration of an example narrative-based search instance according to example embodiments of the present disclosure.

FIG. 11B depicts an illustration of an example refined search result page according to example embodiments of the present disclosure.

Figure 1:
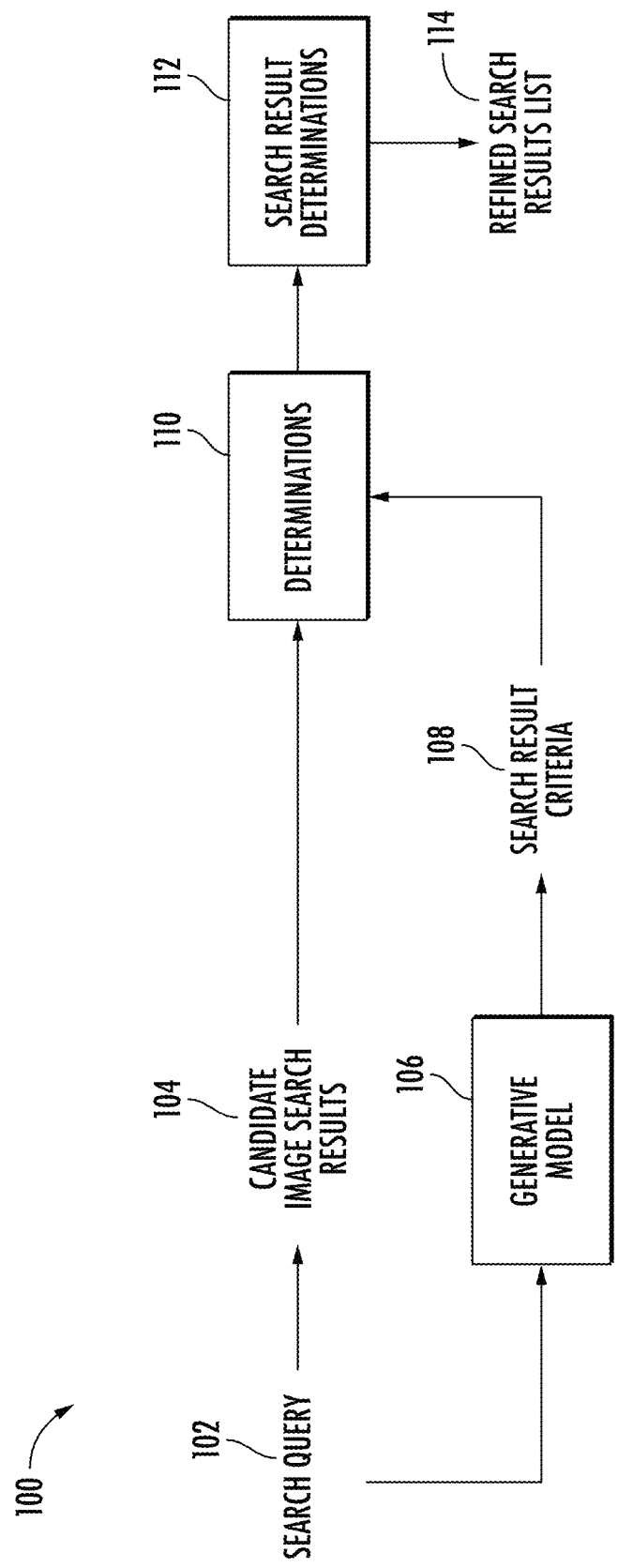
FIG. 1 depicts a block diagram of an example search system according to example embodiments of the present disclosure.

Reference numerals that are repeated across plural figures are intended to identify the same features in various implementations.

DETAILED DESCRIPTION

Generally, the present disclosure is directed to systems and methods for artificial intelligence agent-based image search and refinement. In particular, the systems and methods disclosed herein can leverage an artificial intelligence agent (e.g., an LLM-based agent) to determine the features requested by a search query and identify search results that include the requested features. For example, a search system can receive a search query from a user. The search query can include a text string requesting an image with one or more particular objects, one or more actions, one or more locations, and/or other features. The search system can perform an initial search to determine a set of candidate image search results. The search system may leverage a search engine for the initial search. Alternatively and/or additionally, the search system may perform the initial search on a fixed image database. The search system can leverage a generative model to process the search query to determine a set of search result criteria descriptive of the different feature sets requested by the search query. Based on the set of search result criteria, the search system can perform a plurality of determinations (e.g., determine a plurality of scores based on whether the search result criteria are met (e.g., based on a plurality of classifications)) for each of the candidate image search results of the set of candidate image search results. The search system can then filter and/or adjust the rankings of the candidate image search results based on the determinations (e.g., the scores or classifications generated with respect to the search result criteria). The search system can then provide the refined image search results to the user.

In particular, the systems and methods can include a generative model tuned and/or configured to understand the search query and determine a set of data processing actions to perform based on the search query understanding. The generative model can be leveraged as a router model that generates a prediction output that includes a plurality of different criteria associated with a plurality of requested feature sets and a plurality of tool calls for interfacing with one or more tools to determine whether the candidate image search results meet the plurality of criteria. The one or more tools may include classification heads of the generative model and/or may include external tools (e.g., one or more external classification models, one or more computer vision models, and/or other external tools).

Artificial intelligence agent-based image search and refinement can be implemented for search interfaces, for generating training datasets for other search systems, and/or for improving image search processing for other interfaces. The systems and methods can be leveraged in parallel or in series to other search engine processing to provide for adjustments and/or filtering of results and rankings. The generation of training datasets can be utilized to train embedding models, classification models, and/or other models.

Search engine processing alone can fail to provide search results that meet all objects, actions, and/or other features requested by the search query. Instead, the search results may include a mix of completely-responsive search results, partially-responsive search results, and irrelevant search results. The partially-responsive search results and irrelevant search results may be determined based on the search engine failing to understand word associations, phrases, and/or other term relationships. Alternatively and/or additionally, the partially-responsive search results and irrelevant search results may be determined based on the search results being associated with a portion of the search query.

The systems and methods disclosed herein can leverage generative model processing and computer vision processing to filter candidate image search results based on whether the candidate image search results include features requested by the search query. In particular, a plurality of candidate image search results can be obtained via an embedding based search, an image label-based search, keyword-metadata search, and/or other search techniques. The generative model can process the search query to generate a prediction output descriptive of search result criteria and one or more data processing tool calls for determining whether the candidate image search results include the search result criteria. Based on the one or more data processing tool calls, a plurality of classifications (and/or other determinations) can be performed on each of the candidate image search results. Based on the plurality of classifications, the candidate image search results can be filtered and/or have their ranks adjusted (and/or determined) based on whether the classifications (and/or other determinations) are descriptive of the search result criteria being met. The refined image search results set can include image search results determined to include features requested by the search query. In some implementations, the generative model (e.g., a large language model) can be leveraged to rank and/or determine the refined image search results set. For example, the generative model may rank the candidate image search results to provide the highest ranking results first (e.g., the best search result based on the search result criteria may be displayed first). Therefore, positive images may be provided with priority. Additionally and/or alternatively, the generative model may remove duplicate images, verify image diversity in the refined image search results set (e.g., adjust the set and/or adjust rankings to ensure the refined set includes images that have varying features, which may include different compositions, different sources, different backgrounds, different settings, different lighting, etc.), and/or perform other refined image search results set refinements.

The artificial intelligence agent-based image search and refinement can provide more refined and search query responsive search results that leverage the language understanding of a trained generative language model. The agent can be an LLM-based agent configured, trained, and/or tuned to determine a next task in a data processing instance (e.g., a next tool to utilize in determining the relevant information for responding to a search query) and interact with data processing tools (e.g., external tools that may include classification models, computer vision models, etc.). The systems and methods can ensure the output search results include all and/or an increased number of requested features of the search query. Alternatively and/or additionally, the systems and methods can be leveraged to determine positive and negative search results for a search query, which can then be leveraged to generate a training dataset for training one or more machine-learned models. For example, the training dataset can be leveraged to train an embedding model, which can then be utilized for image search tasks.

The systems and methods can include obtaining a search query. The search query can include one or more user inputs requesting image data including one or more particular feature sets. For example, the search query can include terms descriptive of objects, settings, actions, and/or other terms. The search query can include text data, image data, audio data, latent encoding data, multimodal data, and/or other data.

The systems and methods can include determining a plurality of candidate image search results and/or a plurality of respective search result rankings based on the search query. The plurality of respective search result rankings can be determined based at least in part on historical click data associated with respective results of the plurality of candidate image search results when previous queries associated with similar topics are received. In some implementations, the plurality of candidate image search results can be determined and/or obtained without obtaining the plurality of respective search result rankings. The plurality of candidate image search results can be determined based on performing an initial search with a search engine. The plurality of candidate image search results may include completely-responsive search results, partially-responsive search results, and/or irrelevant search results.

In some implementations, determining the plurality of candidate image search results and/or the plurality of respective search result rankings based on the search query can include processing the search query with an embedding model to generate a query embedding and determining the plurality of candidate image search results and the plurality of respective search result rankings based on a plurality of embedding space distances between the query embedding and a plurality of image embeddings. The embedding model may include a text embedding model that was jointly trained with an image embedding model, which was utilized to generate image embeddings for the candidate image search results.

Alternatively and/or additionally, determining the plurality of candidate image search results and/or the plurality of respective search result rankings based on the search query can include processing the search query to generate a plurality of short-form queries and determining a plurality of candidate image result sets based on searching each of the plurality of short-form queries. The short-form queries can be generated based on parsing the search query. In some implementations, each of the plurality of short-form queries may be a third of the length of the search query or less.

Alternatively and/or additionally, determining the plurality of candidate image search results and/or the plurality of respective search result rankings based on the search query can include processing the search query with the generative model to generate a narrative output descriptive of a scenario in which the one or more particular feature sets would be present and processing the narrative output with a search engine to determine the plurality of candidate image search results and the plurality of respective search result rankings. The narrative output can include one or more complete natural language sentences. The generative model can include an autoregressive language model. The narrative output can be descriptive of a situation in which the requested scene of the search query may occur.

In some implementations, determining the plurality of candidate image search results and/or the plurality of respective search result rankings based on the search query can include performing, based on the search query, a search of an image corpus based on metadata of a plurality of database images. The image corpus may include images from a plurality of different resources and/or may include user images. The image corpus may include images indexed and stored with image metadata. The image metadata may include image details including the photographer, the source, the image title, the image caption, image labels, text associated with the image, time of the image, location where the image was captured, and/or other details.

Alternatively and/or additionally, determining the plurality of candidate image search results and/or the plurality of respective search result rankings based on the search query can include processing the search query with the generative model to generate a plurality of sub-task queries and determining the plurality of candidate image search results by processing each of the plurality of sub-task queries. The sub-task queries can be associated with different feature sets requested by the search query.

The systems and methods can include processing the search query with a generative model to generate a plurality of search result criteria. The plurality of search result criteria can include a set of objects that are determined to be requested based on the generative model processing the search query. In some implementations, the generative model can include a router model trained to interact with external tools and determine a next task in performing search query response processing. The generative model can include a language model trained to understand query intent, multiple languages, misspellings, and typographical errors. In some implementations, the generative model may have been tuned on ground truth satisfactory labels provided during feedback training loops. The generative model can be configured to generate the plurality of search result criteria and to communicate with a plurality of tools (e.g., a plurality of classification models) to perform a plurality of determinations (e.g., a plurality of classifications). The plurality of determinations may include determining a plurality of scores based on the plurality of search result criteria. In some implementations, outputs of the plurality of determinations (e.g., the plurality of scores and/or the plurality of classifications) can be transmitted back to the generative model to perform rankings determinations and/or adjustments. The plurality of search result criteria can include a set of binary logic strings. The logic strings can include if-then operations such that "if an image includes 'x', then increase the ranking" and/or "if an image does not include 'x', then decrease the ranking and/or filter the image out".

In some implementations, processing the search query with the generative model to generate the plurality of search result criteria can include processing the search query with the generative model to generate a binary criteria list descriptive of features that are requested by the search query. The plurality of respective search result rankings can be determined and/or adjusted based on whether respective candidate image search results satisfy list items of the binary criteria list. For example, the ranking can be boosted if the criteria is met, and the ranking can be decreased if the criteria is not met. In some implementations, the binary criteria list may be utilized as a plurality of filters for the candidate image search results.

Alternatively and/or additionally, processing the search query with the generative model to generate the plurality of search result criteria can include processing the search query with the generative model to generate a model-generated ranking rubric for evaluating the plurality of image search results. The model-generated ranking rubric may include a plurality of logic operations.

The systems and methods can include processing, for at least a subset of the plurality of image search results, a respective candidate image search result of the plurality of candidate image search results to perform a plurality of determinations (e.g., a plurality of classifications and/or determining a plurality of scores based on whether the respective image includes the plurality of search result criteria) associated with the plurality of search result criteria. The plurality of determinations can include determining a plurality of scores. The plurality of scores may include and/or may be based on a plurality of classifications. The plurality of classifications can include binary classifications, probability classifications, label output classifications, and/or other classifications.

In some implementations, the generative model can interface, based on the plurality of routing calls, with the plurality of different classification models to perform a plurality of classifications for each of the plurality of candidate image search results. The plurality of different classification models can be separate from the generative model.

In some implementations, the generative model can process the plurality of candidate image search results, the plurality of search result criteria, and each of the plurality of determinations (e.g., scores and/or classifications) to generate the refined set of image search results descriptive of a subset of the plurality of candidate image search results that include the plurality of particular feature sets. The refinement may be performed based on filtering the candidate image search results based on the plurality of classifications.

Additionally and/or alternatively, processing, for at least the subset of the plurality of image search results, the respective candidate image search result of the plurality of candidate image search results to perform the plurality of determinations (e.g., determining the plurality of scores) associated with the plurality of search result criteria can include processing the plurality of image search results with an auto-rater configured for low-latency rating. The auto-rater may perform a plurality of binary classifications with one or more classifiers, then evaluate the respective candidate image search result based on the plurality of binary classifications.

The systems and methods can include determining and/or adjusting the plurality of respective search result rankings of the plurality of candidate image search results based on each of the plurality of classifications. The determination and/or adjustment may be performed by the generative model, the auto-rater, and/or external ranking engine.

In some implementations, determining the plurality of candidate image search results and/or the plurality of respective search result rankings based on the search query can include obtaining between 80 to 250 candidate image search results and determining and/or adjusting the plurality of respective search result rankings of the plurality of candidate image search results based on each of the plurality of classifications can include filtering the plurality of candidate image search results based on the plurality of classifications.

The systems and methods can include providing a refined image search results list for display in response to determining and/or adjusting the plurality of respective search result rankings of the plurality of candidate image search results based on each of the plurality of determinations (e.g., the plurality of scores and/or the plurality of classifications). The refined image search results list can include a set of image search results that include scores (e.g., classifications) descriptive of the plurality of search result criteria being met. The refined image search results list can include a plurality of image search results that meet the plurality of search results criteria. The refined image search results list can be provided for display via a search results interface.

In some implementations, the systems and methods can include storing the search query and the refined set of image search results as a training example and training an embedding model based at least in part on the training example including the search query and the refined set of image search results.

In some implementations, the systems and methods disclosed herein may be leveraged for searching videos. The systems and methods may be utilized to index and/or re-index videos. Indexing and/or searching videos may include breaking down the videos into a plurality of parts then processing each of the parts.

In some implementations, the systems and methods disclosed herein can be leveraged to generate a training dataset for training, conditioning, and/or tuning an image generation model (e.g., a text-to-image diffusion model).

In some implementations, the artificial intelligence agent search filtering system can work on top of and/or in parallel with an existing image retrieval and ranking system. The artificial intelligence agent search filtering system can achieve user-defined goals by strategically interacting with tools and autonomously selecting optimal actions. The AI agent (e.g., an LLM-based agent) can analyze the query and come up with the rating template for any given query. In some implementations, the AI agent (e.g., an LLM-based agent) can use the rating template and act as a multimodal auto-rater which evaluates each image and checks if the image fully complies with the user provided query.

The systems and methods of the present disclosure provide a number of technical effects and benefits. As one example, the system and methods can determine image search results that are responsive to complex search queries. In particular, the systems and methods can leverage a generative model to understand a search query and interface with one or more external tools to determine which candidate search results are responsive to an entirety of a complex search query. The systems and methods may perform an initial search that is then refined and/or filtered based on the generative model output.

In instances in which downstream operations or actions are performed based on the returned images, the quality or accuracy of such downstream operations can be improved as a result of improving the quality or accuracy of the returned images. As one example, the returned images may be included as example images in a few shot example prompt or a retrieval augmented generation prompt for a downstream model to perform a task (e.g., a diagnostic task). The quality of the downstream model relative to the task (e.g., the diagnostic task) can be improved by improving the quality of accuracy of images included in the few shot example prompt or the retrieval augmented generation prompt.

Another technical benefit of the systems and methods of the present disclosure is the ability to leverage machine-learned models (e.g., classification models) communicatively connected with a generative model to determine whether criteria of a search query are met. In particular, the systems and methods can generate a routing output with the generative model to determine which and/or how to leverage a plurality of different classification models to determine which candidate images are responsive to the search query.

Another example of technical effect and benefit relates to improved computational efficiency and improvements in the functioning of a computing system. For example, the systems and methods disclosed herein can leverage the search result refinement to reduce and/or mitigate the quantity of iterative searches. The accuracy improvement can reduce the number of follow-up queries, while also reducing the number of secondary results pages that are visited. Moreover, the outputs of the systems and methods disclosed herein may be leveraged to train and/or tune an embedding model for complex query processing tasks. The trained and/or tuned model may experience increased performance, while being less computationally expensive than performing the full candidate image determination and generative model-based filtering described herein.

With reference now to the Figures, example embodiments of the present disclosure will be discussed in further detail.

FIG. 1 depicts a block diagram of an example search system 100 according to example embodiments of the present disclosure. In some implementations, the search system 100 is configured to receive, and/or obtain, a search query 102 descriptive of a request an image with one or more objects, one or more actions, one or more setting details, and/or one or more other details and, as a result of receipt of the search query 102, generate, determine, and/or provide a refined search results list 114 that includes a plurality of images determined to be responsive to the search query 102. Thus, in some implementations, the search system 100 can include a generative model 106 that is operable to generate a prediction output descriptive of a plurality of search result criteria 108 and a plurality of tool calls for determining whether the plurality of search result criteria 108 are met by the image results.

In particular, the search system 100 can obtain the search query 102 from a user computing device. The search query 102 can include text data, image data, audio data, latent encoding data, multimodal data, and/or other data. The search query 102 may include a request for two or more objects performing a particular action (e.g., a cat and a dog playing).

The search system 100 can process the search query 102 to determine a plurality of candidate image search results 104. The plurality of candidate image search results 104 may be determined by a search engine. The plurality of candidate image search results 104 may include a plurality of images obtained from an image corpus determined based on an embedding-based search, a keyword search, a metadata search, an image label search, a short-form queries search, a narrative output search, a learned search strategy search, and/or other search technique.

A generative model 106 can process the search query 102 to generate a plurality of search result criteria 108. The generative model 106 can include an autoregressive language model. The generative model 106 may include a router model tuned to determine external tools to interface with to perform a search task. The plurality of search result criteria 108 can be descriptive of a plurality of feature sets requested by the search query 102.

Based on the outputs of the generative model 106, the search system 100 can perform a plurality of determinations 110 for each of the plurality of candidate image search results 104 to determine whether the respective candidate image search result meets the plurality of search result criteria 108. The plurality of determinations 110 may include determining a plurality of scores for the plurality of candidate image search results based on evaluating whether the images include the plurality of search result criteria 108. The plurality of determinations 110 may include a plurality of classifications. The plurality of scores may be descriptive of and/or based on the plurality of classifications. The plurality of determinations 110 may be performed by classification heads of the generative model 106 and/or by external classification models. The plurality of classifications 110 may include a plurality of binary classifications, a plurality of probability classifications, a plurality of label classifications, and/or a plurality of other classifications.

Based on the plurality of determination output sets, the search system 100 can perform search result determinations 112 to rank, re-rank, and/or filter the plurality of candidate image search results 104. Based on the rankings and/or the filtering, a refined search results list 114 can be generated. The refined search results list 114 can then be provided to the user.

Figure 2:
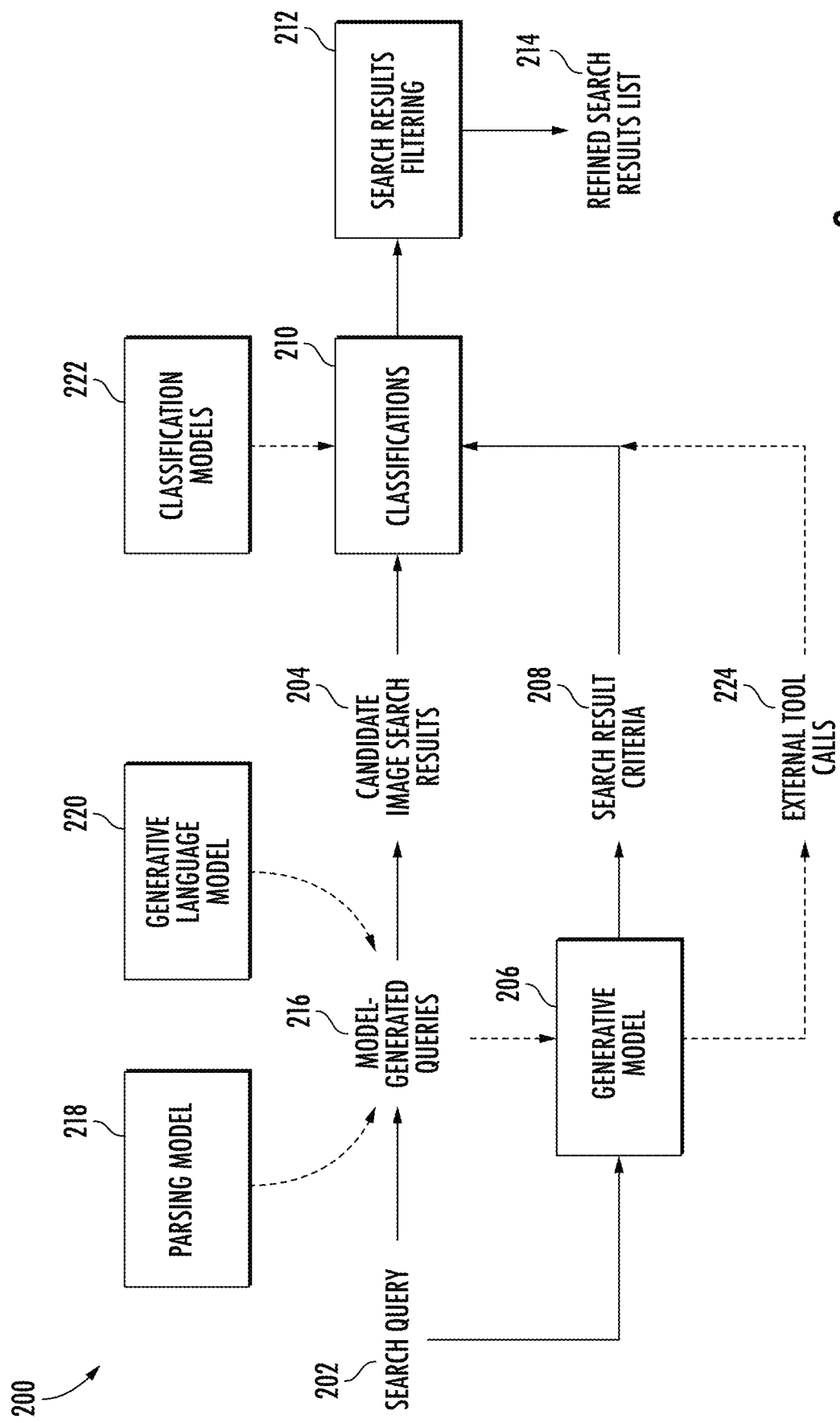
FIG. 2 depicts a block diagram of an example search refinement system according to example embodiments of the present disclosure.

FIG. 2 depicts a block diagram of an example search refinement system 200 according to example embodiments of the present disclosure. The search refinement system 200 is similar to search system 100 of FIG. 1 except that search refinement system 200 further includes a parsing model 218, a generative language model 220, and a plurality of classification models 222.

In particular, the search refinement system 200 can obtain the search query 202 from a user computing device. The search query 202 may include a text string, an example image, a soft prompt, a multimodal input, and/or other inputs. The search query 202 can include text data, image data, audio data, latent encoding data, multimodal data, and/or other data. The search query 202 may include a request for two or more objects performing a particular action (e.g., a young woman dancing with an old man in the park).

The search refinement system 200 can process the search query 202 to determine a plurality of candidate image search results 204. The plurality of candidate image search results 204 may be determined by a search engine. The plurality of candidate image search results 204 may include a plurality of images obtained from an image corpus determined based on an embedding-based search, a keyword search, a metadata search, an image label search, a short-form queries search, a narrative output search, a learned search strategy search, and/or other search technique.

For example, the plurality of candidate image search results 204 can be determined based on processing the search query 202 to determine a plurality of model-generated queries 216 that can then be searched to determine the plurality of candidate image search results 204. In some implementations, the plurality of model-generated queries 216 can be determined by processing the search query 202 with a parsing model 218, a generative language model 220, and/or other machine-learned model. The parsing model 218 can parse (or segment) the search query 202 to generate a plurality of short-form queries. The generative language model 220 may be separate from, part of, or the same as the generative model 206. The generative language model 220 may include a natural language processing model (e.g., an autoregressive language model) tuned to generate a narrative output and/or short-form queries.

A generative model 206 can process the search query 202 to generate a plurality of search result criteria 208 (e.g., a plurality of logic operations descriptive of a list of criteria required for image search results to be completely-responsive to the search query 202) and/or a plurality of external tool calls 224 for interfacing with external tools to determine whether the plurality of search result criteria 208 are met. The generative model 206 can include an autoregressive language model. The generative model 206 may include a router model tuned to determine external tools to interface with to perform a search task. The plurality of search result criteria 208 can be descriptive of a plurality of feature sets requested by the search query 202.

Based on the plurality of external tool calls 224, a plurality of classification models 222 can perform a plurality of classifications 210 for each of the plurality of candidate image search results 204 to determine whether the respective candidate image search result meets the plurality of search result criteria 208. The plurality of classifications 210 may be performed by classification heads of the generative model 206 and/or by external classification models. The plurality of classifications 210 may include a plurality of binary classifications, a plurality of probability classifications, a plurality of label classifications, and/or a plurality of other classifications. The plurality of classification models 222 may be general classification models and/or a plurality of different specialized classification models.

Based on the plurality of classification output sets, the search refinement system 200 can perform search result filtering 212 to filter the plurality of candidate image search results 204 to remove and/or penalize image search results that do not meet the plurality of search result criteria 208. Based on the filtering, a refined search results list 214 can be generated. The refined search results list 214 can then be provided to the user. The refined search results list 214 may be provided for display via a search results interface, a homepage, an augmented-reality experience, and/or other interface.

Figure 3:
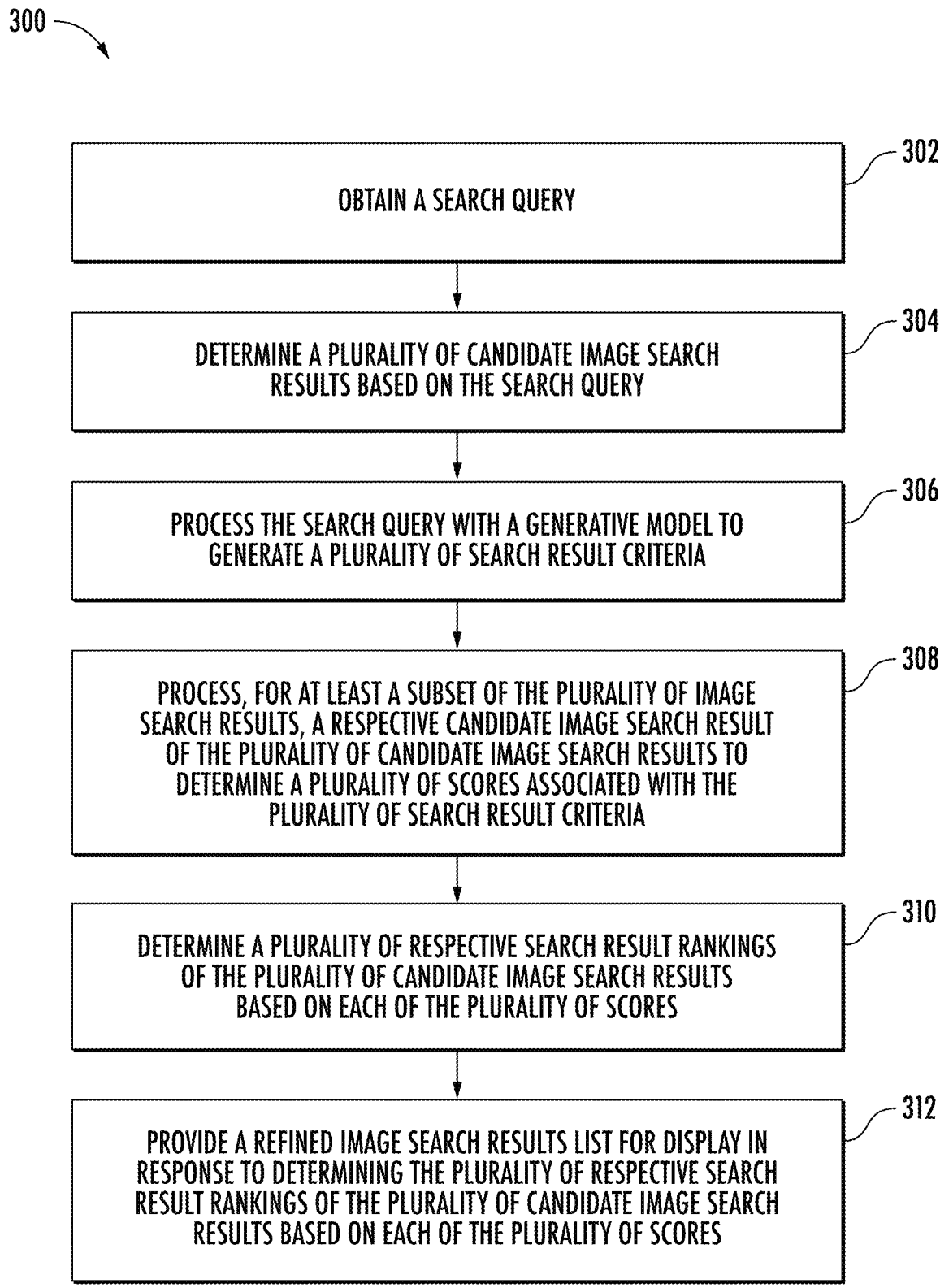
FIG. 3 depicts a flow chart diagram of an example method to perform ranking adjustment according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a search query. The search query can include one or more inputs requesting image data including one or more particular feature sets. For example, the search query can include terms descriptive of objects, settings, actions, and/or other terms. The search query can include text data, image data, audio data, latent encoding data, multimodal data, and/or other data.

At 304, the computing system can determine a plurality of candidate image search results based on the search query. The plurality of candidate image search results can be determined with one or more search engines and/or one or more machine-learned models. In some implementations, a plurality of respective search result rankings can be determined and/or obtained for the plurality of candidate image search results. The plurality of candidate image search results can be determined based on an embedding-based search with the plurality of respective search result rankings being determined based on embedding distances. Alternatively and/or additionally, the plurality of respective search result rankings may be determined with one or more ranking models.

In some implementations, determining the plurality of candidate image search results and/or the plurality of respective search result rankings based on the search query can include processing the search query with an embedding model to generate a query embedding and determining the plurality of candidate image search results and the plurality of respective search result rankings based on a plurality of embedding space distances between the query embedding and a plurality of image embeddings. The embedding model may be a pre-trained machine-learned model trained to generate embeddings descriptive of features associated with objects, locations, and/or other features. The embeddings can include feature representations comprising data descriptive of a plurality of machine-readable feature vectors.

Alternatively and/or additionally, determining the plurality of candidate image search results and/or the plurality of respective search result rankings based on the search query can include processing the search query to generate a plurality of short-form queries and determining a plurality of candidate image result sets based on searching each of the plurality of short-form queries. The plurality of short-form queries can include concise rewrites of the search query and/or a plurality of sub-queries in which each sub-query is associated with a different sub-task of the query. Sub-tasks can be associated with a particular topic, object, action, and/or other task.

Alternatively and/or additionally, determining the plurality of candidate image search results and/or the plurality of respective search result rankings based on the search query can include processing the search query with the generative model to generate a narrative output descriptive of a scenario in which the one or more particular feature sets would be present and processing the narrative output with a search engine to determine the plurality of candidate image search results and the plurality of respective search result rankings. The narrative output can include one or more complete natural language sentences. The generative model can include an autoregressive language model. The generative model may include a multimodal generative model configured, trained, and/or tuned to process multimodal data. For example, the multimodal generative model can process input text and input image(s) to generate model-generated queries, search result criteria, tool calls, and/or outputs. In some implementations, the generative model can process the search query, the search result criteria, the classifications, the scores, the candidate image search results, and/or other data to rank the candidate image search results to generate the refined search results.

At 306, the computing system can process the search query with a generative model to generate a plurality of search result criteria. The plurality of search result criteria can include a set of objects that are determined to be requested based on the generative model processing the search query. The generative model can include a router model trained to interact with external tools and determine a next task in performing search query response processing. The generative model can include a language model trained to understand query intent, multiple languages, misspellings, and typographical errors. The router model may be trained and/or configured to determine particular tools to utilize, generate application programming interface calls for the determined particular tool, then leveraging one or more application programming interfaces to perform the application programming interface calls.

In some implementations, processing the search query with the generative model to generate the plurality of search result criteria can include processing the search query with the generative model to generate a binary criteria list descriptive of features that are requested by the search query. The plurality of respective search result rankings can be determined and/or adjusted based on whether respective candidate image search results satisfy list items of the binary criteria list. In some implementations, the generative model and/or one or more classifiers communicatively connected with the generative model can then be leveraged for determining whether the binary criteria list is satisfied.

At 308, the computing system can process, for at least a subset of the plurality of image search results, a respective candidate image search result of the plurality of candidate image search results to determine a plurality of scores associated with the plurality of search result criteria. The plurality of scores can be a plurality of classifications and/or may be based on the plurality of classifications. The plurality of scores and/or the classifications can be descriptive of whether criteria of the plurality of search result criteria. The plurality of classifications may include binary classifications, probabilities, classification labels, and/or other classifications outputs. The plurality of classifications may be generated with one or more classifiers communicatively connected with the generative model and/or one or more classification heads of the generative model.

In some implementations, processing, for at least the subset of the plurality of image search results, the respective candidate image search result of the plurality of candidate image search results to determine the plurality of scores associated with the plurality of search result criteria can include processing the plurality of image search results with an auto-rater configured for low-latency rating. The auto-rater can perform a plurality of binary classifications with one or more classifiers, then evaluate the respective candidate image search result based on the plurality of binary classifications. The auto-rater can include a machine-learned model, heuristic-based logic strings, deterministic functions, and/or other processing layers. The auto-rater may be a machine-learned ranking model. The auto-rater may process the binary labels, classification probabilities, classification labels, and/or other forms of classifications to adjust the rankings.

At 310, the computing system can determine the plurality of respective search result rankings of the plurality of candidate image search results based on each of the plurality of scores. The determinations may be based on referencing the plurality of classifications and the plurality of search results criteria. The adjustments may be performed by the auto-rater and/or other ranking model. The auto-rater may include a ranking engine configured to work in series with or in parallel with a search engine. In some implementations, the initial candidate image results rankings may be adjusted and/or replaced based on the scores.

At 312, the computing system can provide a refined image search results list for display in response to determining the plurality of respective search result rankings of the plurality of candidate image search results based on each of the plurality of scores. Providing the refined image search results list for display can include providing the refined image search results list in a graphical user interface. The graphical user interface may include a search results interface. The refined image search results list can include a plurality of images. The plurality of images may be provided in a carousel interface, a grid interface, and/or other interface.

In some implementations, determining the plurality of candidate image search results and/or the plurality of respective search result rankings based on the search query can include obtaining between 80 to 250 candidate image search results. Determining and/or adjusting the plurality of respective search result rankings of the plurality of candidate image search results based on each of the plurality of classifications can include filtering the plurality of candidate image search results based on the plurality of classifications.

Figure 4A:
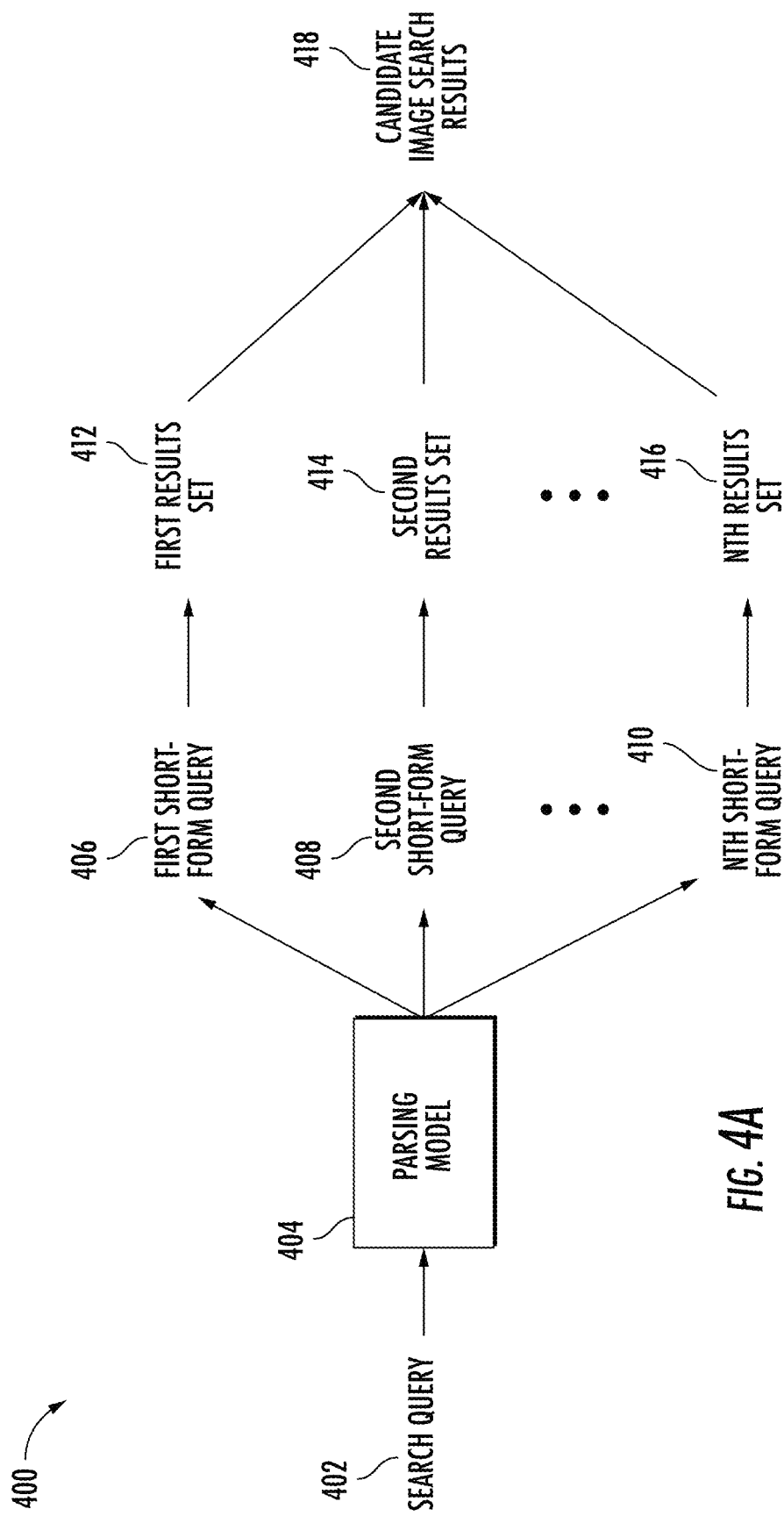
FIG. 4A depicts a block diagram of an example query branching system according to example embodiments of the present disclosure.

FIG. 4A depicts a block diagram of an example query branching system 400 according to example embodiments of the present disclosure. In particular, the query branching system 400 can be utilized to determine the plurality of candidate image search results 412.

For example, the query branching system 400 can obtain a search query 402. The search query can include a string of text that includes a plurality of objects, actions, setting details, and/or other details requested for in an image. The search query 402 may include five or more terms. The search query 402 may include a plurality of phrases, a plurality of sentences, and/or a plurality of paragraphs.

A parsing model 404 (and/or other model) can process the search query 402 to generate a plurality of short-form queries. The plurality of short-form queries may include a plurality of model-generated queries that are shorter than the search query 402. The plurality of short-form queries may include parts of the search query 402. The plurality of short-form queries may include a first short-form query 406, a second short-form query 408, and/or an nth short-form query 410.

Each of the plurality of short-form queries can then be processed with a search system (e.g., a search engine) to determine a plurality of results sets. The results sets may include a respective search results set for each of the plurality of short-form queries. The plurality of results sets may include a plurality of image sets. The plurality of results sets can include a first results set 412 for the first short-form query 406, a second results set 414 for the second short-form query 408, and/or an nth results set 416 for the nth short-form query 410.

The plurality of results sets can then be utilized as and/or utilized to determine the plurality of candidate image search results.

Figure 4B:
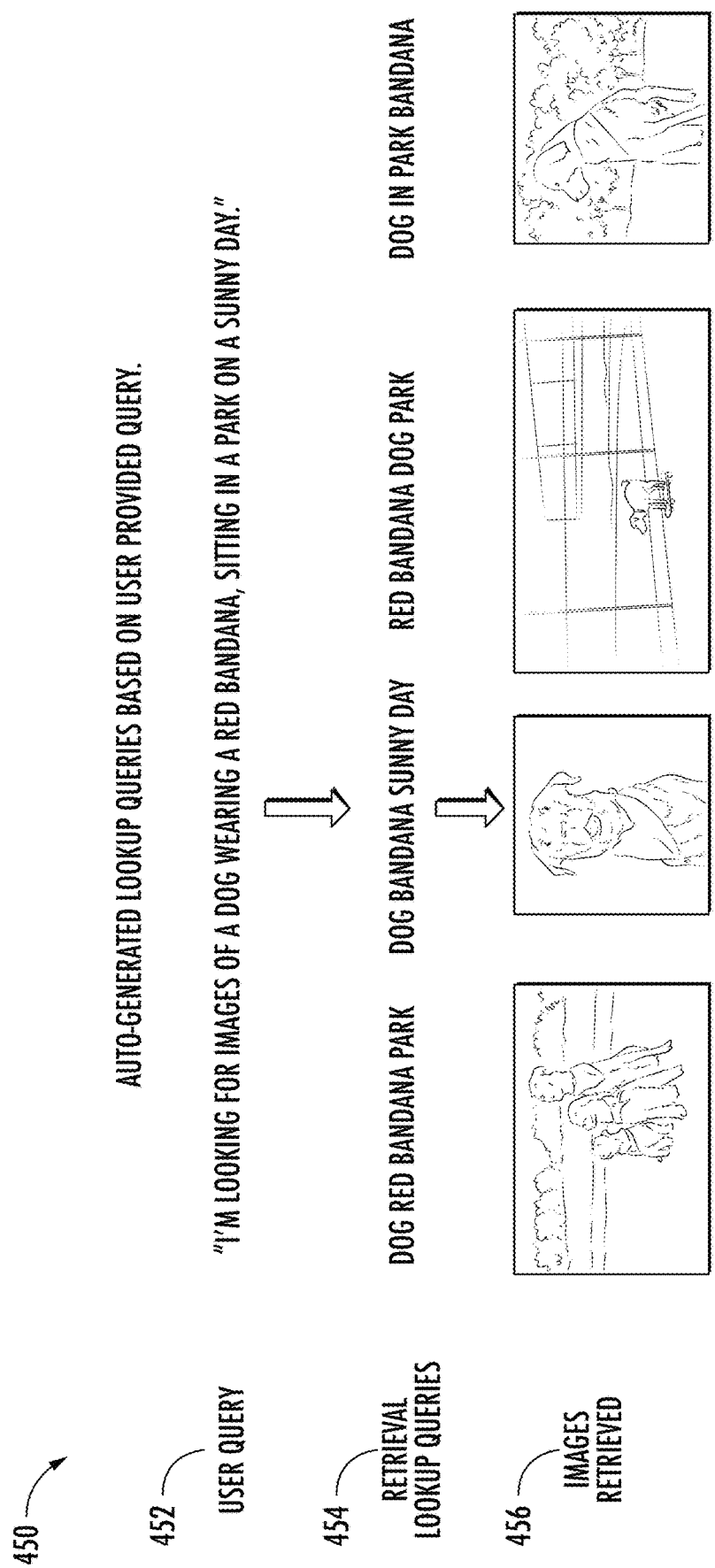
FIG. 4B depicts an illustration of an example query branching instance according to example embodiments of the present disclosure.

FIG. 4B depicts an illustration of an example query branching instance 450 according to example embodiments of the present disclosure. In particular, FIG. 4B depicts an example user query 452, example short-form queries 454, and example candidate image results 456. For example, the user query 452 can be processed to generate lookup queries that may only include selected terms from the user query 452. The lookup queries can then be leveraged to retrieve images for the candidate image results 456.

Figure 5A:
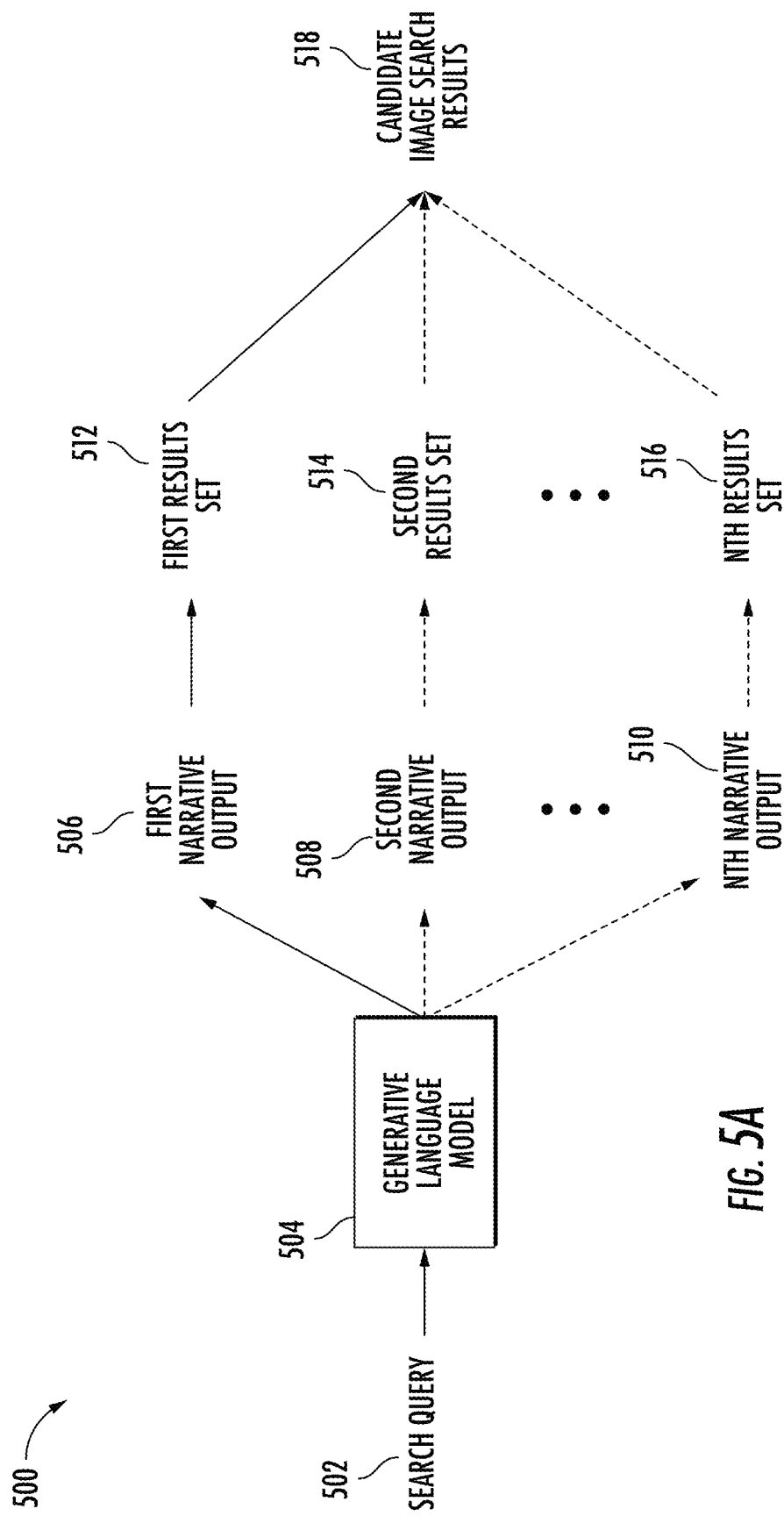
FIG. 5A depicts a block diagram of an example narrative-based search system according to example embodiments of the present disclosure.

FIG. 5A depicts a block diagram of an example narrative-based search system 500 according to example embodiments of the present disclosure. In particular, the narrative-based search system 500 can be utilized to determine the plurality of candidate image search results 512.

For example, the narrative-based search system 500 can obtain a search query 502. The search query can include a string of text that includes a plurality of objects, actions, setting details, and/or other details requested for in an image. The search query 502 may include five or more terms. The search query 502 may include a plurality of phrases, a plurality of sentences, and/or a plurality of paragraphs.

A generative language model 504 (and/or other model) can process the search query 402 to generate one or more narrative outputs. The one or more narrative outputs may include a plurality of model-generated narratives descriptive of scenarios in which the requirements of the search query 502 may be depicted. The one or more narrative outputs may include terms of the search query 502 rewritten into a story of a situation (or scenario). The one or more narrative outputs may include a first narrative output 506, a narrative output 508, and/or an nth narrative output 510. The generative language model 504 may be the same as the generative model leveraged for filter routing and/or may be a separate model. The generative language model 504 may include an autoregressive language model.

Each of the one or more narrative outputs can then be processed with a search system (e.g., a search engine) to determine a plurality of results sets. The results sets may include a respective search results set for each of the one or more narrative outputs. The plurality of results sets may include a plurality of image sets. The plurality of results sets can include a first results set 512 for the first narrative output 506, a second results set 514 for the second narrative output 508, and/or an nth results set 516 for the nth narrative output 510.

The plurality of results sets can then be utilized as and/or utilized to determine the plurality of candidate image search results.

FIG. 5B depicts an illustration of an example narrative-based search instance 550 according to example embodiments of the present disclosure. In particular, FIG. 5B depicts an example user query 552, example narrative outputs 554 (e.g., a plurality of real world scenarios), and example candidate image results 558. For example, the user query 552 can be processed to generate real world scenarios that may be descriptive of scenarios that may depict the requested scene of the user query 552. The real world scenarios can then be leveraged to retrieve images for the candidate image results 558. Alternatively and/or additionally, a plurality of short-form queries 556 (e.g., a plurality of lookup queries) may be generated from the narrative outputs 554 (e.g., the plurality of real world scenarios). The lookup queries can then be leveraged to retrieve images for the candidate image results 558.

Figure 6:
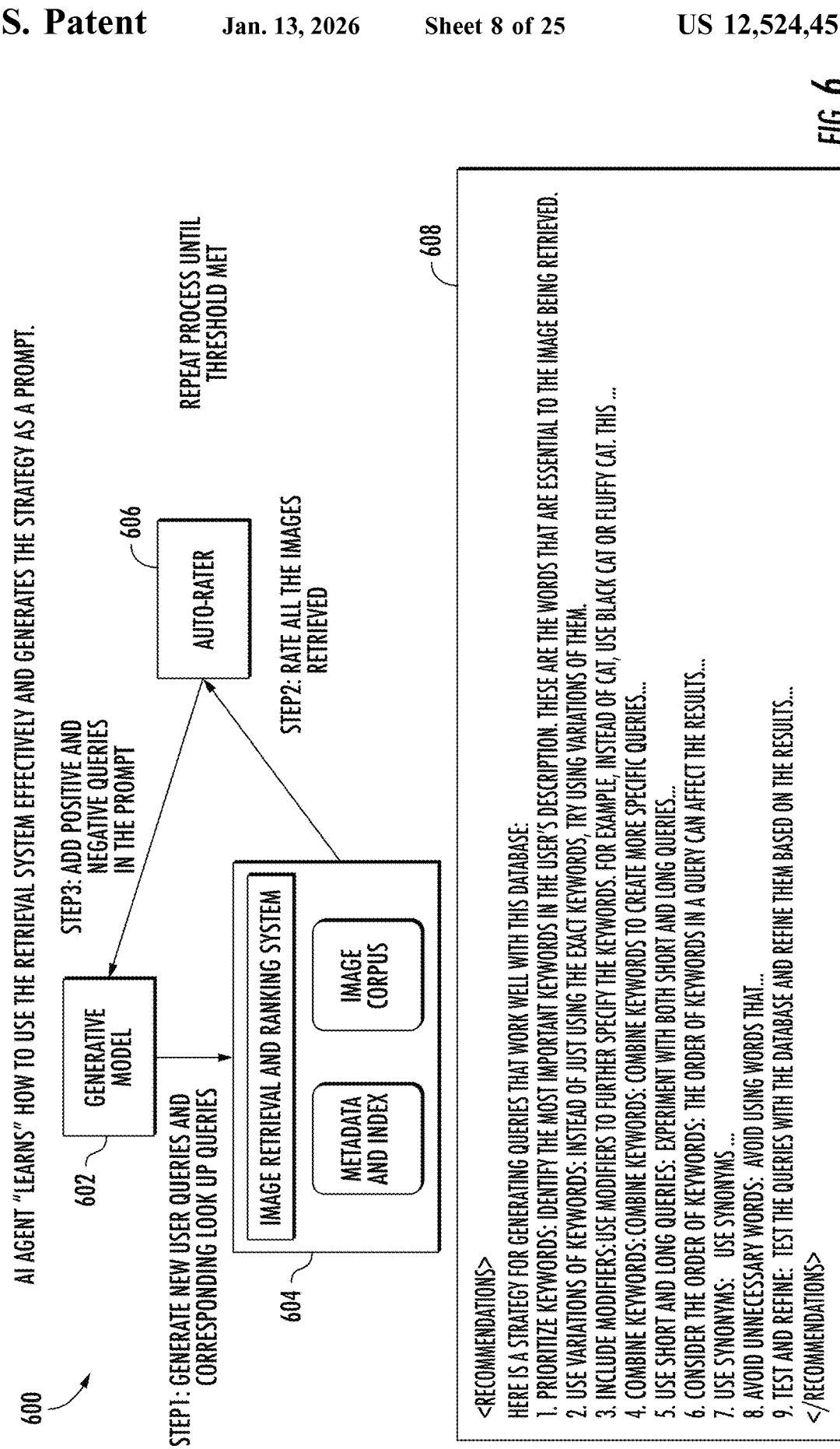
FIG. 6 depicts a block diagram of an example search strategy refinement system according to example embodiments of the present disclosure.

FIG. 6 depicts a block diagram of an example search strategy refinement system 600 according to example embodiments of the present disclosure. In particular, the search strategy refinement system 600 can iteratively generating new user queries and corresponding look up queries, rating all the images retrieved, and adding positive and negative queries in the prompt until a threshold is met (e.g., a token size has been met and/or a threshold number of training examples has been generated).

For example, a generative model 602 (e.g., a large language model tuned for search query task routing and external tool interfacing) can process a search query to generate new user queries and corresponding look up queries. An image retrieval and ranking system 604 can then process the new queries and the lookup queries to retrieve and rate a plurality of images from an image corpus based on image metadata and/or other indexed data. An auto-rater 606 can process the image search results and the initial rankings to re-rank and/or rate the candidate image results. Positive and negative queries (e.g., positive queries can be queries that led to search results that are fully responsive to the initial search query, and negative queries can be queries that led to search results that are not fully responsive to the initial search query) and/or positive and negative results can then be added to the search query prompt based on the outputs of the auto-rater 606. The process can be repeated until a threshold is met. The threshold may include a certain number of positive and negative examples (e.g., five of each, twenty total, etc.), a certain number of tokens (e.g., 100,000 tokens, one million tokens, two million tokens, etc.), a certain number of loops (e.g., five loops, ten loops, etc.), and/or other thresholds.

Once the threshold is met, the refined search query prompt can then be processed with the generative model 602 to generate a search strategy 608 that can then be executed to perform a search instance. The image search results of this search instance can then be provided to the user.

Figure 7:
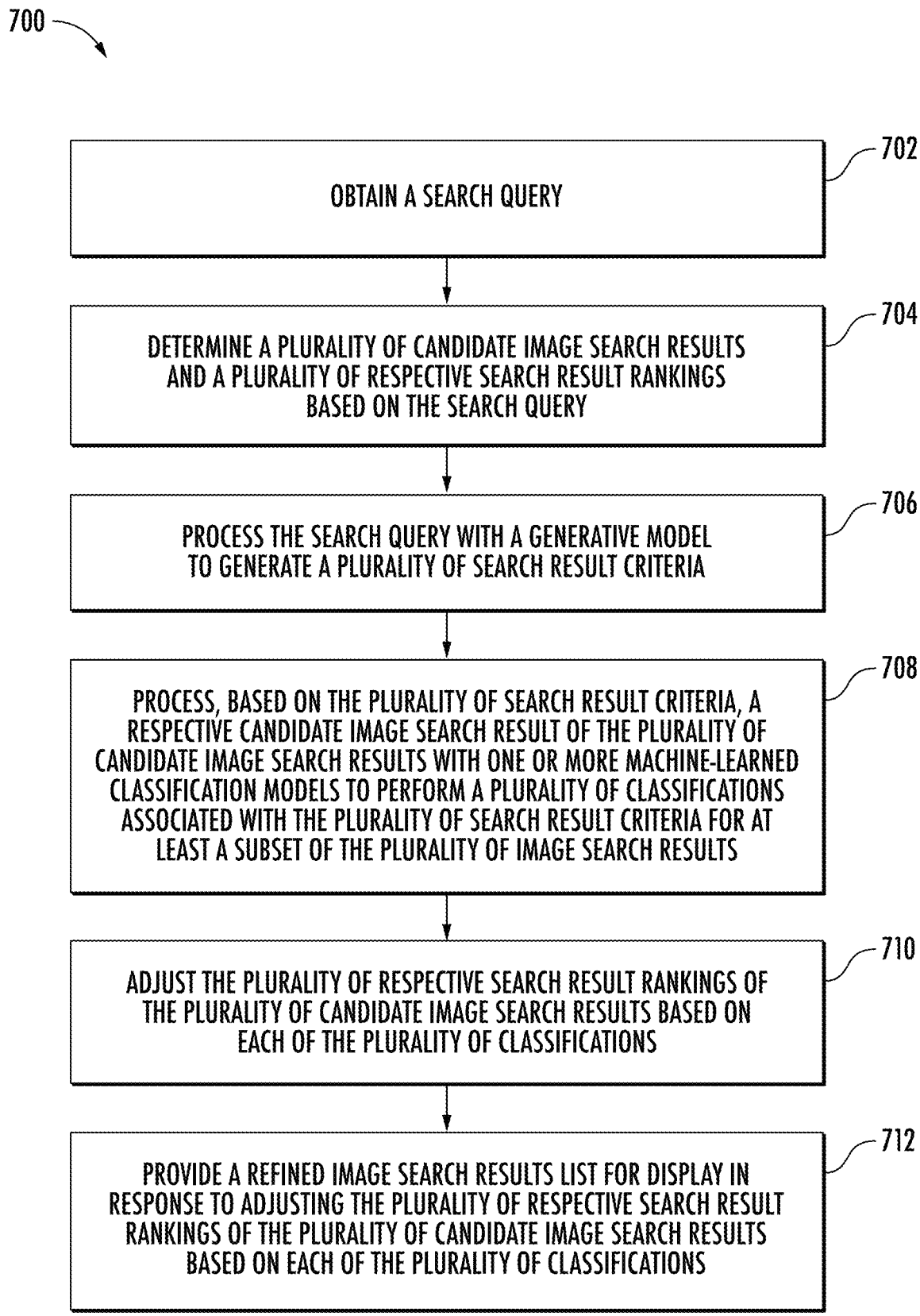
FIG. 7 depicts a flow chart diagram of an example method to perform classification-based filtering according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a search query. The search query can include one or more user inputs requesting image data including one or more particular objects and one or more particular actions. The one or more particular objects can include animals, furniture, clothing, individuals, vehicles, architectural structures, and/or other objects. The one or more particular actions can be associated with actions being performed by the one or more particular objects (e.g., kittens playing, a dog swimming, a ball falling, a television playing, etc.). In some implementations, the one or more particular actions can include an event occurring within a scene (e.g., storming, dancing, etc.), an action being performed during image capture (e.g., rotating, jumping, etc.), and/or other action.

At 704, the computing system can determine a plurality of candidate image search results and a plurality of respective search result rankings based on the search query. The plurality of respective search result rankings can be determined based at least in part on historical click data associated with respective results of the plurality of candidate image search results when previous queries associated with similar topics are received. For example, the plurality of candidate image search results and a plurality of respective search result rankings can be determined with a search engine, and the search engine can identify frequently selected image results for other queries similar to the input search query. The plurality of candidate image search results can include a plurality of images stored via one or more databases. The plurality of candidate image search results may be obtained from across the internet. In some implementations, at least a subset of the plurality of candidate image search results may be obtained from local storage of a user computing device.

At 706, the computing system can process the search query with a generative model to generate a plurality of search result criteria. The plurality of search result criteria can be descriptive of the one or more particular objects and the one or more particular actions. In some implementations, the plurality of search result criteria can include a set of binary logic strings. The generative model may have been tuned on ground truth satisfactory labels provided during feedback training loops. The generative model can be configured to generate the plurality of search result criteria and to communicate with a plurality of classification models to perform the plurality of classifications. Outputs of the plurality of classifications can be transmitted back to the generative model to perform rankings adjustments.

In some implementations, processing the search query with the generative model to generate the plurality of search result criteria can include processing the search query with the generative model to generate a model-generated ranking rubric for evaluating the plurality of image search results. The model-generated ranking rubric may be a natural language rubric, a structured output, and/or a model-readable embedding representation.

At 708, the computing system can process, based on the plurality of search result criteria, a respective candidate image search result of the plurality of candidate image search results with one or more machine-learned classification models to perform a plurality of classifications associated with the plurality of search result criteria for at least a subset of the plurality of image search results. The one or more machine-learned classification models may be invoked based on an output of the generative model and/or an application programming interface. The one or more machine-learned classification models may be selected based on the criteria of the plurality of search result criteria.

At 710, the computing system can adjust the plurality of respective search result rankings of the plurality of candidate image search results based on each of the plurality of classifications. The adjustments can be based on determining whether the plurality of classifications are descriptive of the plurality of search result criteria being met. The adjustment may be performed by processing the plurality of candidate image search results, the plurality of respective search result rankings, the plurality of classifications, and the plurality of search results criteria with a generative model.

At 712, the computing system can provide a refined image search results list for display in response to adjusting the plurality of respective search result rankings of the plurality of candidate image search results based on each of the plurality of classifications. The refined image search results list can include a set of image search results that includes classifications descriptive of the plurality of search result criteria being met.

Figure 8:
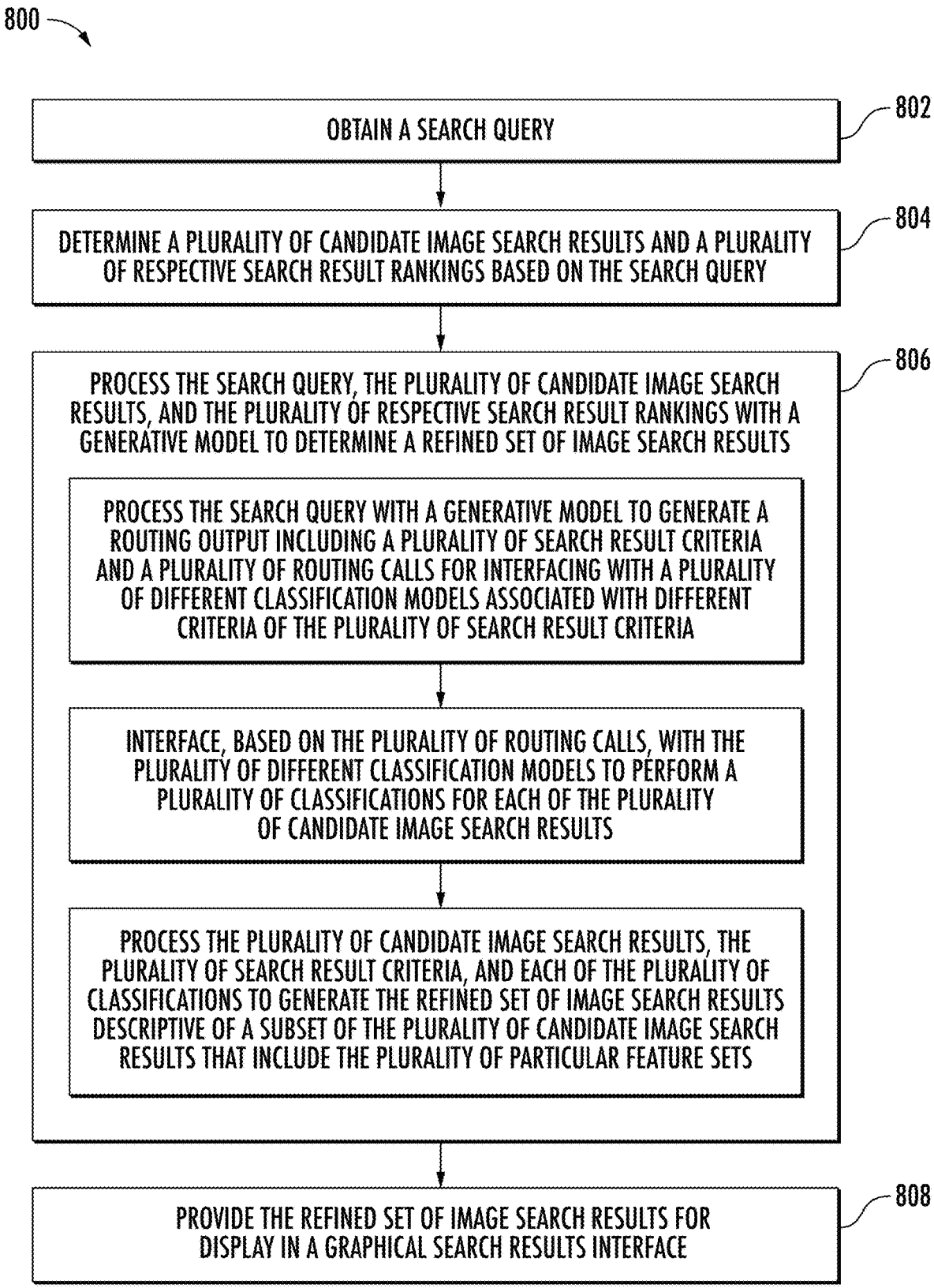
FIG. 8 depicts a flow chart diagram of an example method to perform search result refinement according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a search query. The search query can include one or more user inputs requesting image data including a plurality of particular feature sets. The search query can include a text string, one or more images, one or more audio files, one or more latent representations, a multimodal input, and/or other input. The search query may be obtained via a query input box of a search interface. Additionally and/or alternatively, the search query may be obtained via a graphical keyboard interface on a user computing device.

At 804, the computing system can determine a plurality of candidate image search results and a plurality of respective search result rankings based on the search query. The plurality of candidate image search results and the plurality of respective search result rankings may be determined based on a keyword search, a large language model-aided search, an embedding-based search, object-matching-based search, and/or other search techniques.

In some implementations, determining the plurality of candidate image search results and the plurality of respective search result rankings based on the search query can include performing, based on the search query, a search of an image corpus based on metadata of a plurality of database images. The image corpus can include a plurality of different images depicting a variety of different objects, actions, settings, and/or other features. The image corpus can include real world images, art, and/or synthetic images (e.g., model-generated images and/or augmented images).

Alternatively and/or additionally, determining the plurality of candidate image search results and the plurality of respective search result rankings based on the search query can include processing the search query with the generative model to generate a plurality of sub-task queries and determining the plurality of candidate image search results by processing each of the plurality of sub-task queries.

At 806, the computing system can process the search query, the plurality of candidate image search results, and the plurality of respective search result rankings with a generative model to determine a refined set of image search results. The refined set of image search results can include a subset of the plurality of candidate image search results.

In some implementations, determining the refined set of image search results can include processing the search query with a generative model to generate a routing output including a plurality of search result criteria and a plurality of routing calls for interfacing with a plurality of different classification models associated with different criteria of the plurality of search result criteria.

Additionally and/or alternatively, determining the refined set of image search results can include interfacing, based on the plurality of routing calls, with the plurality of different classification models to perform a plurality of classifications for each of the plurality of candidate image search results.

Additionally and/or alternatively, determining the refined set of image search results can include processing the plurality of candidate image search results, the plurality of search result criteria, and each of the plurality of classifications to generate the refined set of image search results descriptive of a subset of the plurality of candidate image search results that include the plurality of particular feature sets.

At 808, the computing system can provide the refined set of image search results for display in a graphical search results interface. The graphical search results interface can include a plurality of search tabs, a plurality of panels, an input box, and/or other user interface elements. The refined set of image search results may be ordered based on the rankings, the classifications, image quality, context, and/or other details.

In some implementations, the computing system can store the search query and the refined set of image search results as a training example and train an embedding model based at least in part on the training example including the search query and the refined set of image search results.

Figure 9A:
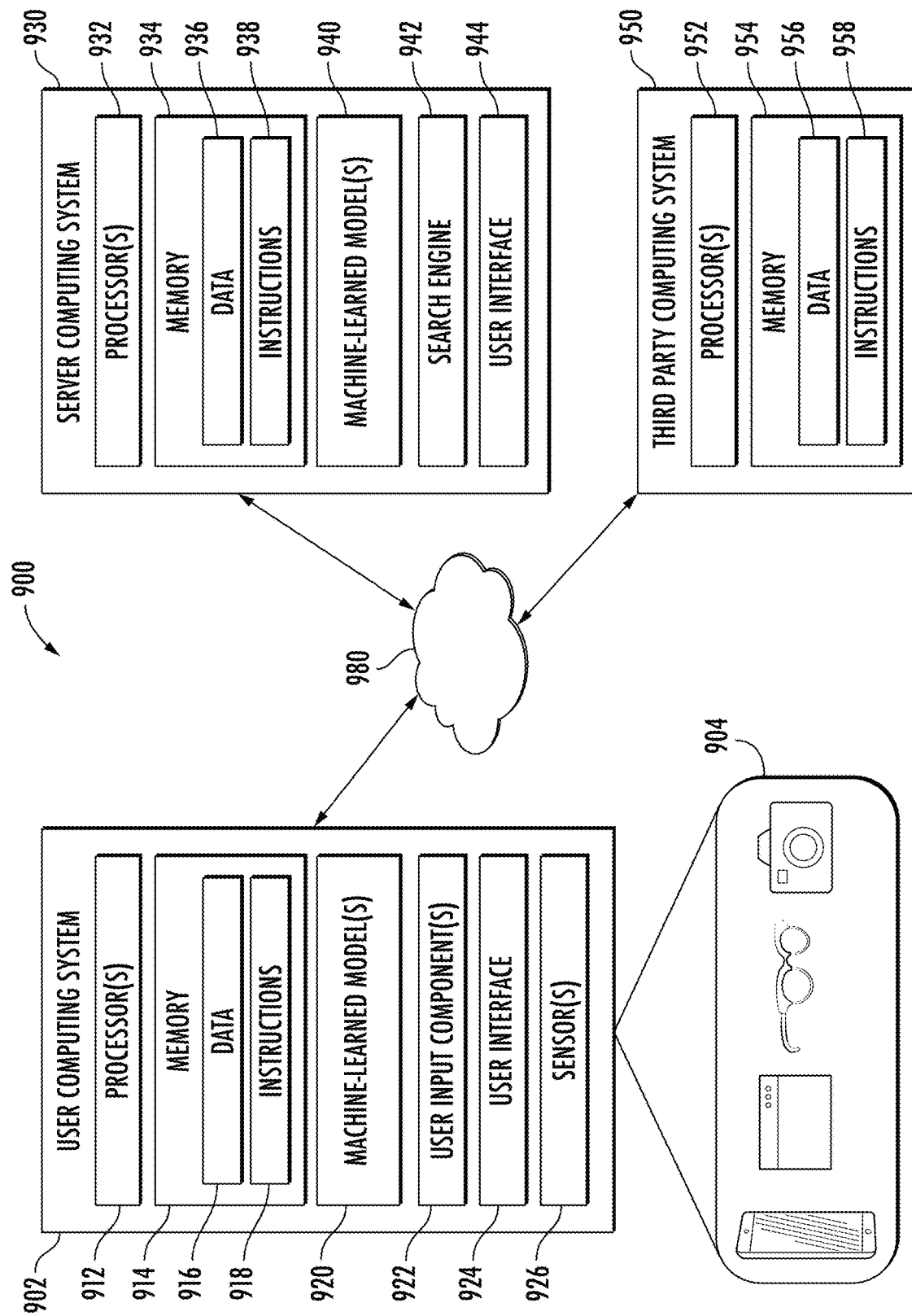
FIG. 9A depicts a block diagram of an example computing system that performs generative model-based search result refinement according to example embodiments of the present disclosure.

FIG. 9A depicts a block diagram of an example computing system 900 that performs generative model-based search result refinement according to example embodiments of the present disclosure. The system 900 includes a user computing system 902, a server computing system 930, and/or a third party computing system 950 that are communicatively coupled over a network 980.

The user computing system 902 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing system 902 to perform operations.

In some implementations, the user computing system 902 can store or include one or more machine-learned models 920. For example, the machine-learned models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 920 can be received from the server computing system 930 over network 980, stored in the user computing device memory 914, and then used or otherwise implemented by the one or more processors 912. In some implementations, the user computing system 902 can implement multiple parallel instances of a single machine-learned model 920 (e.g., to perform parallel machine-learned model processing across multiple instances of input data and/or detected features).

More particularly, the one or more machine-learned models 920 may include one or more detection models, one or more classification models, one or more segmentation models, one or more augmentation models, one or more generative models, one or more natural language processing models, one or more optical character recognition models, and/or one or more other machine-learned models. The one or more machine-learned models 920 can include one or more transformer models. The one or more machine-learned models 920 may include one or more neural radiance field models, one or more diffusion models, and/or one or more autoregressive language models.

The one or more machine-learned models 920 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 920 can process image data, text data, audio data, and/or latent encoding data to generate output data that can include image data, text data, audio data, and/or latent encoding data. The one or more machine-learned models 920 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Machine-learned model(s) can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Choice Routing*, ARXIV: 2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

Additionally or alternatively, one or more machine-learned models 940 can be included in or otherwise stored and implemented by the server computing system 930 that communicates with the user computing system 902 according to a client-server relationship. For example, the machine-learned models 940 can be implemented by the server computing system 930 as a portion of a web service (e.g., a viewfinder service, a visual search service, an image processing service, an ambient computing service, and/or an overlay application service). Thus, one or more models 920 can be stored and implemented at the user computing system 902 and/or one or more models 940 can be stored and implemented at the server computing system 930.

The user computing system 902 can also include one or more user input components 922 that receives user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system 902 can store and/or provide one or more user interfaces 924, which may be associated with one or more applications. The one or more user interfaces 924 can be configured to receive inputs and/or provide data for display (e.g., image data, text data, audio data, one or more user interface elements, an augmented-reality experience, a virtual reality experience, and/or other data for display. The user interfaces 924 may be associated with one or more other computing systems (e.g., server computing system 930 and/or third party computing system 950). The user interfaces 924 can include a viewfinder interface, a search interface, a generative model interface, a social media interface, and/or a media content gallery interface.

The user computing system 902 may include and/or receive data from one or more sensors 926. The one or more sensors 926 may be housed in a housing component that houses the one or more processors 912, the memory 914, and/or one or more hardware components, which may store, and/or cause to perform, one or more software packets. The one or more sensors 926 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 902 may include, and/or be part of, a user computing device 904. The user computing device 904 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more user computing devices 904. For example, a camera of a smartphone may be utilized to capture image data descriptive of the environment, and/or an overlay application of the user computing device 904 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIG. 9B.

Additionally and/or alternatively, the server computing system 930 can include and/or be communicatively connected with a search engine 942 that may be utilized to crawl one or more databases (and/or resources). The search engine 942 can process data from the user computing system 902, the server computing system 930, and/or the third party computing system 950 to determine one or more search results associated with the input data. The search engine 942 may perform term based search, label based search, Boolean based searches, image search, embedding based search (e.g., nearest neighbor search), multimodal search, and/or one or more other search techniques.

The server computing system 930 may store and/or provide one or more user interfaces 944 for obtaining input data and/or providing output data to one or more users. The one or more user interfaces 944 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 902 and/or the server computing system 930 can train the models 920 and/or 940 via interaction with the third party computing system 950 that is communicatively coupled over the network 980. The third party computing system 950 can be separate from the server computing system 930 or can be a portion of the server computing system 930. Alternatively and/or additionally, the third party computing system 950 may be associated with one or more web resources, one or more web platforms, one or more other users, and/or one or more contexts.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

The third party computing system 950 can include one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the third party computing system 950 to perform operations. In some implementations, the third party computing system 950 includes or is otherwise implemented by one or more server computing devices.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the task can be a generative task, and the one or more machine-learned models (e.g., 920 and/or 940) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 902 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing system 900.

The central intelligence layer can communicate with a central device data layer. The central device data layer can be a centralized repository of data for the computing system 900. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
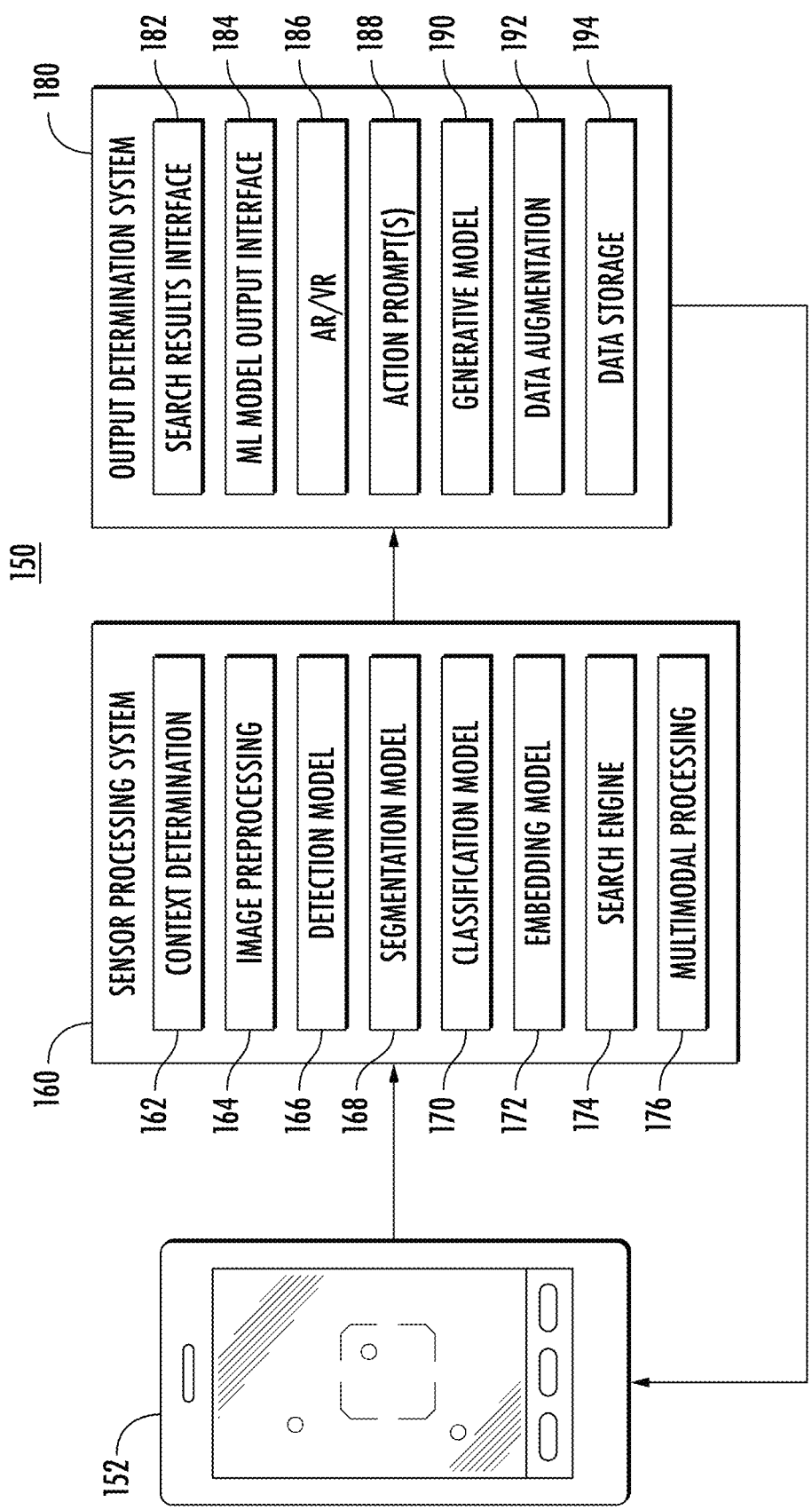
FIG. 9B depicts a block diagram of an example computing system that performs generative model-based search result refinement according to example embodiments of the present disclosure.

FIG. 9B depicts a block diagram of an example computing system 150 that performs generative model-based search result refinement according to example embodiments of the present disclosure. In particular, the example computing system 150 can include one or more computing devices 152 that can be utilized to obtain, and/or generate, one or more datasets that can be processed by a sensor processing system 160 and/or an output determination system 180 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 152 (e.g., one or more sensors in the computing device 152). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 152 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 160. The sensor processing system 160 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 162, which may determine a context associated with one or more content items. The context determination block 162 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 160 may include an image preprocessing block 164. The image preprocessing block 164 may be utilized to adjust one or more values of an obtained and/or received image to prepare the image to be processed by one or more machine-learned models and/or one or more search engines 174. The image preprocessing block 164 may resize the image, adjust saturation values, adjust resolution, strip and/or add metadata, and/or perform one or more other operations.

In some implementations, the sensor processing system 160 can include one or more machine-learned models, which may include a detection model 166, a segmentation model 168, a classification model 170, an embedding model 172, and/or one or more other machine-learned models. For example, the sensor processing system 160 may include one or more detection models 166 that can be utilized to detect particular features in the processed dataset. In particular, one or more images can be processed with the one or more detection models 166 to generate one or more bounding boxes associated with detected features in the one or more images.

Additionally and/or alternatively, one or more segmentation models 168 can be utilized to segment one or more portions of the dataset from the one or more datasets. For example, the one or more segmentation models 168 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 170 can be utilized to process image data, text data, audio data, latent encoding data, multimodal data, and/or other data to generate one or more classifications. The one or more classification models 170 can include one or more image classification models, one or more object classification models, one or more text classification models, one or more audio classification models, and/or one or more other classification models. The one or more classification models 170 can process data to determine one or more classifications.

In some implementations, data may be processed with one or more embedding models 172 to generate one or more embeddings. For example, one or more images can be processed with the one or more embedding models 172 to generate one or more image embeddings in an embedding space. The one or more image embeddings may be associated with one or more image features of the one or more images. In some implementations, the one or more embedding models 172 may be configured to process multimodal data to generate multimodal embeddings. The one or more embeddings can be utilized for classification, search, and/or learning embedding space distributions.

The sensor processing system 160 may include one or more search engines 174 that can be utilized to perform one or more searches. The one or more search engines 174 may crawl one or more databases (e.g., one or more local databases, one or more global databases, one or more private databases, one or more public databases, one or more specialized databases, and/or one or more general databases) to determine one or more search results. The one or more search engines 174 may perform feature matching, text based search, embedding based search (e.g., k-nearest neighbor search), metadata based search, multimodal search, web resource search, image search, text search, and/or application search.

Additionally and/or alternatively, the sensor processing system 160 may include one or more multimodal processing blocks 176, which can be utilized to aid in the processing of multimodal data. The one or more multimodal processing blocks 176 may include generating a multimodal query and/or a multimodal embedding to be processed by one or more machine-learned models and/or one or more search engines 174.

The output(s) of the sensor processing system 160 can then be processed with an output determination system 180 to determine one or more outputs to provide to a user. The output determination system 180 may include heuristic based determinations, machine-learned model based determinations, user selection based determinations, and/or context based determinations.

The output determination system 180 may determine how and/or where to provide the one or more search results in a search results interface 182. Additionally and/or alternatively, the output determination system 180 may determine how and/or where to provide the one or more machine-learned model outputs in a machine-learned model output interface 184. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 160 may be utilized to generate and/or provide an augmented-reality experience and/or a virtual-reality experience 186. For example, the one or more obtained datasets may be processed to generate one or more augmented-reality rendering assets and/or one or more virtual-reality rendering assets, which can then be utilized to provide an augmented-reality experience and/or a virtual-reality experience 186 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 188 may be determined based on the output(s) of the sensor processing system 160. For example, a search prompt, a purchase prompt, a generate prompt, a reservation prompt, a call prompt, a redirect prompt, and/or one or more other prompts may be determined to be associated with the output(s) of the sensor processing system 160. The one or more action prompts 188 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 160 may be processed with one or more generative models 190 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 190 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 190 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 190 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 190 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 190 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g., for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 190 may be stored on-device and/or may be stored on a server computing system. In some implementations, the one or more generative models 190 can perform on-device processing to determine suggested searches, suggested actions, and/or suggested prompts. The one or more generative models 190 may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models 190 can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

The output determination system 180 may process the one or more datasets and/or the output(s) of the sensor processing system 160 with a data augmentation block 192 to generate augmented data. For example, one or more images can be processed with the data augmentation block 192 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 160 may be stored based on a data storage block 194 determination.

The output(s) of the output determination system 180 can then be provided to a user via one or more output components of the user computing device 152. For example, one or more user interface elements associated with the one or more outputs can be provided for display via a visual display of the user computing device 152.

The processes may be performed iteratively and/or continuously. One or more user inputs to the provided user interface elements may condition and/or affect successive processing loops.

Figure 10:
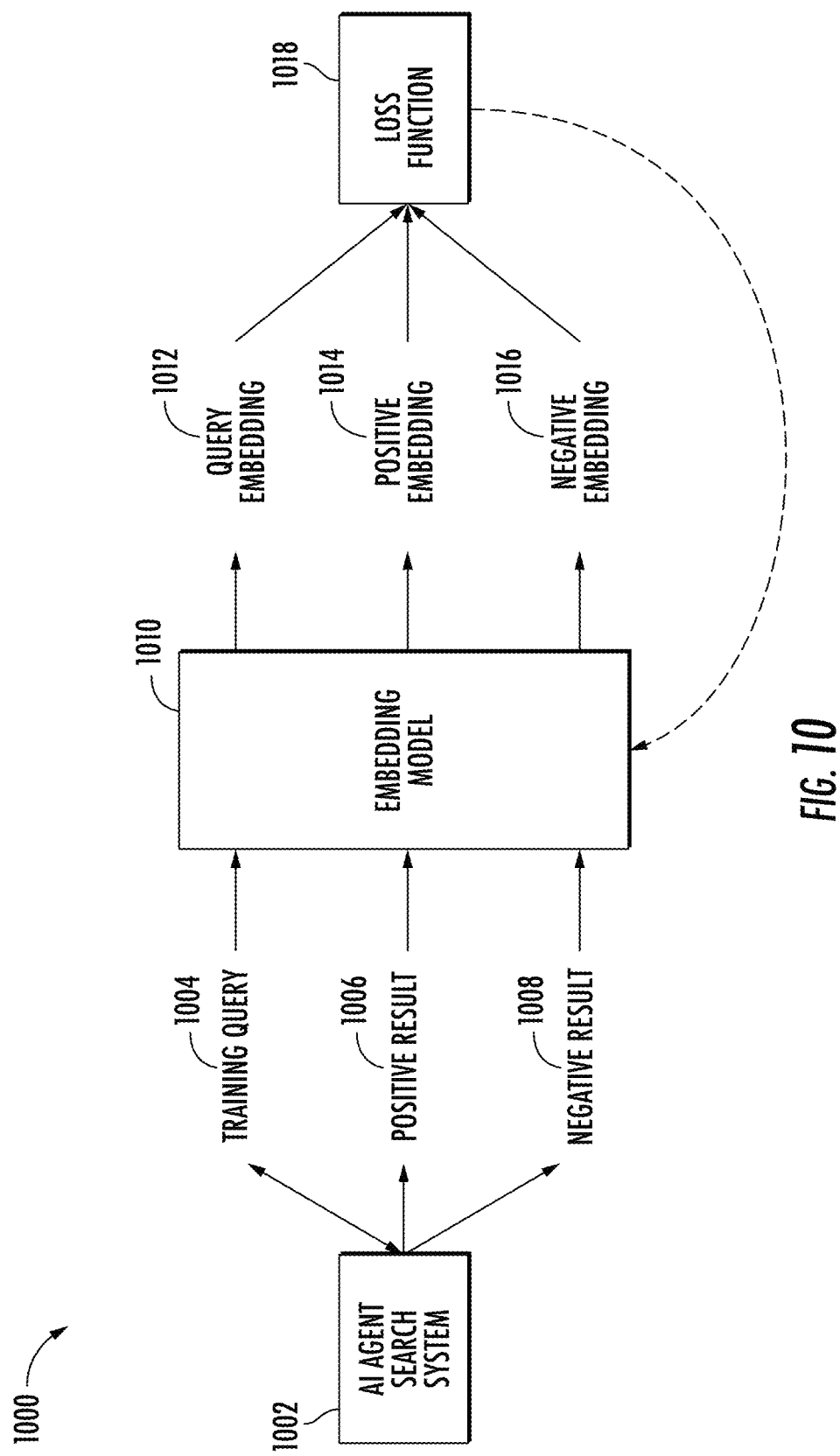
FIG. 10 depicts a block diagram of an example embedding model training system according to example embodiments of the present disclosure.

FIG. 10 depicts a block diagram of an example embedding model training system according to example embodiments of the present disclosure. In particular, the artificial intelligence agent search system 1002 can be leveraged to generate training examples for training an embedding model 1010 for generating query and/or image embeddings. The trained embedding model 1010 can then be leveraged for another search system.

For example, the artificial intelligence agent search system 1002 can process a training query 1004 and/or candidate image results for the training query 1004 to determine a positive result 1006 descriptive of candidate image result that is completely-responsive to the training query 1004 and a negative result 1008 descriptive of candidate image result that is determined to not be completely-responsive to the training query 1004. The training query 1004, the positive result 1006, and the negative result 1008 can then be utilized to generate a training triplet for training one or more machine-learned models.

In particular, the training query 1004 can be processed with an embedding model 1010 to generate a query embedding 1012. The query embedding 1012 can be a set of vector values descriptive of a vector representation of the features of the training query 1004. The positive result 1006 can be processed with the embedding model 1010 to generate a positive embedding 1014. The positive embedding 1014 can be a set of vector values descriptive of a vector representation of the features of the image associated with the positive result 1006. The negative result 1008 can be processed with the embedding model 1010 to generate a negative embedding 1016. The negative embedding 1016 can be a set of vector values descriptive of a vector representation of the features of the image associated with the negative result 1008.

In some implementations, the embedding model 1010 may include a text embedding model for text inputs and an image embedding model for image inputs. The text embedding model and the image embedding model may be jointly trained or may be trained separately.

The query embedding 1012, the positive embedding 1014, and the negative embedding 1016 can be evaluated with a loss function 1018 to generate a gradient descent. The gradient descent can then be backpropagated to the embedding model 1010 to adjust one or more parameters of the embedding model. The loss function 1018 can include a penalization term for if the query embedding 1012 is similar to the negative embedding 1016 and can include a boost term for if the query embedding 1012 is similar to the positive embedding 1014. The parameter adjustment can cause the embedding model 1010 to adjust the embedding generation such that future query embeddings 1012 are closer in the embedding space to the positive embedding 1014 and farther away from the negative embedding 1016.

Figure 11A:
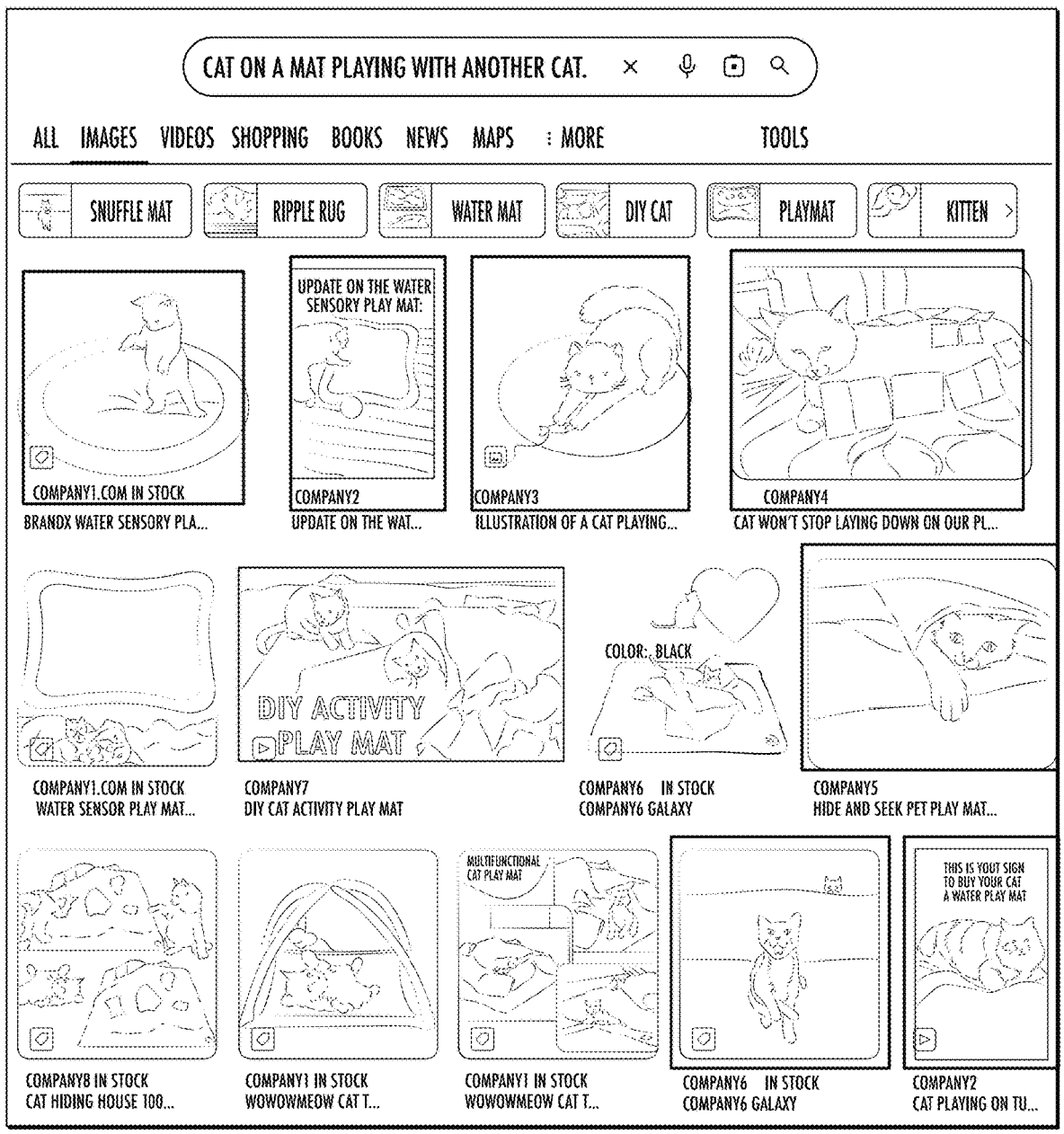
FIG. 11A depicts an illustration of an example pre-refinement search result page according to example embodiments of the present disclosure.

FIG. 11A depicts an illustration of an example pre-refinement search result page 1100 according to example embodiments of the present disclosure. In particular, the pre-refinement search result page 1100 can depict search results determined by a search engine without the artificial intelligence agent processing. The search results that are not fully responsive to the search query are indicated with boxes.

Figure 11B:
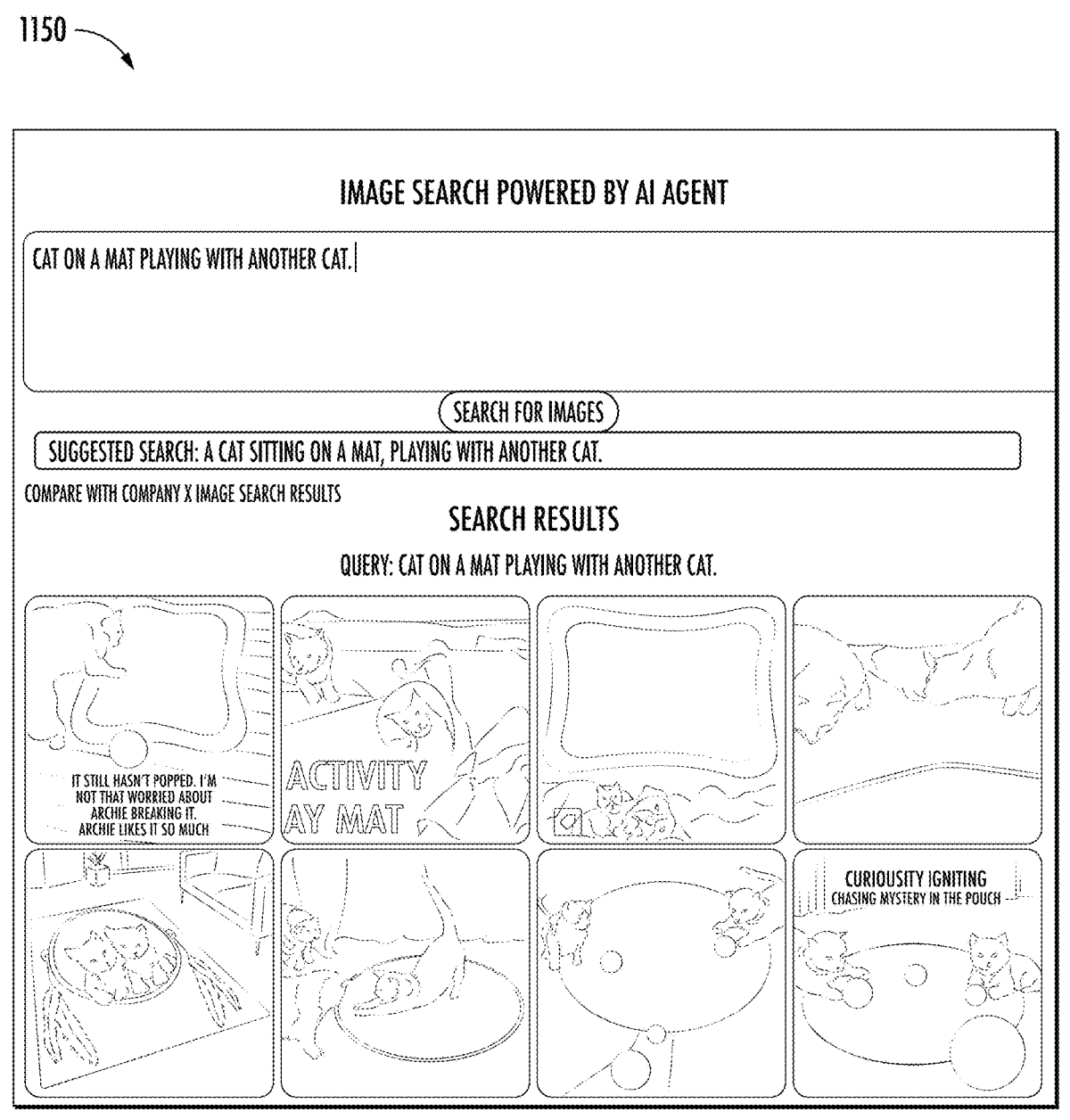

FIG. 11B depicts an illustration of an example refined search result page 1150 according to example embodiments of the present disclosure. In particular, the refined search result page 1150 can depict search results determined by the systems and methods disclosed herein. The search results can be filtered such that only completely-responsive search results are provided for display.

Figure 12:
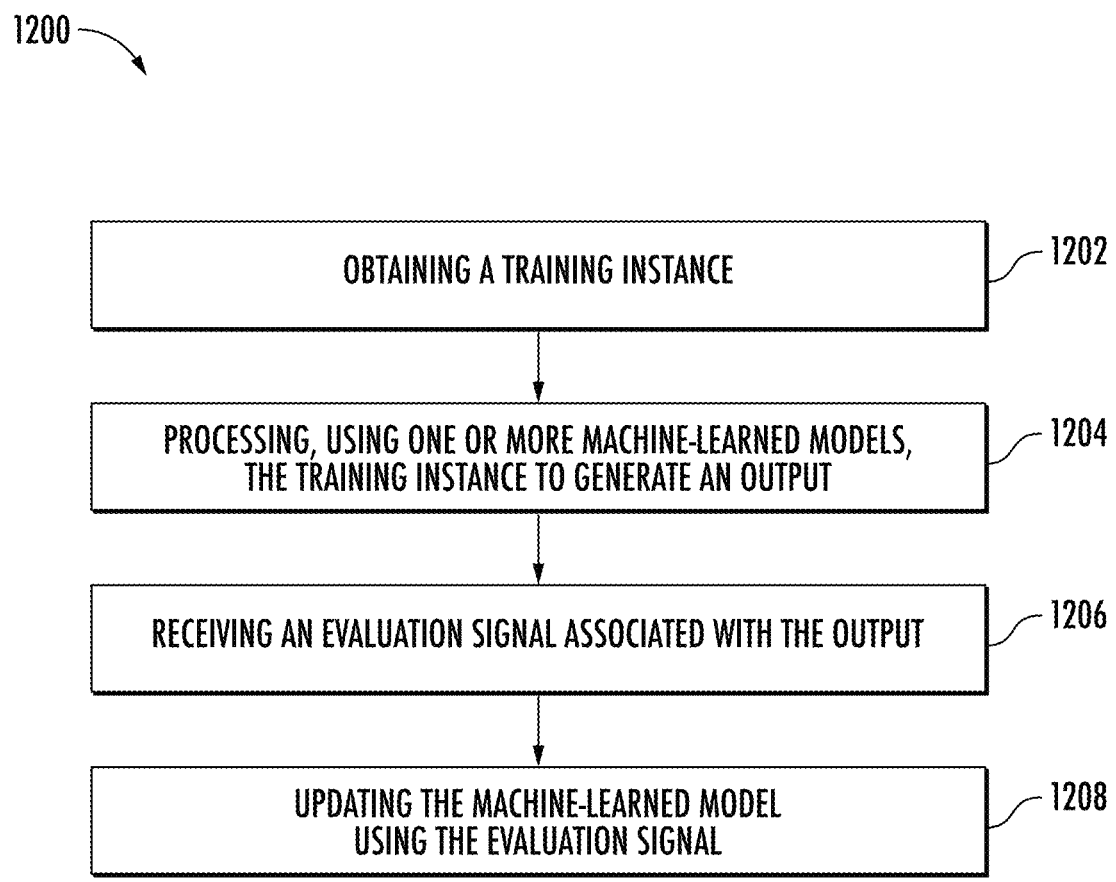
FIG. 12 depicts a flow chart diagram illustrating an example method for training a machine-learned model according to example implementations of aspects of the present disclosure.

FIG. 12 depicts a flowchart of a method 1200 for training one or more machine-learned models according to aspects of the present disclosure. For instance, an example machine-learned model can include a generative model (e.g., a generative language model (e.g., a large language model), an image generation model (e.g., a text-to-image diffusion model), an audio generation model, and/or other generative models), a classification model, an embedding model, and/or other model.

One or more portion(s) of example method 1200 can be implemented by a computing system that includes one or more computing devices such as, for example, computing systems described with reference to the other figures. Each respective portion of example method 1200 can be performed by any (or any combination) of one or more computing devices. Moreover, one or more portion(s) of example method 1200 can be implemented on the hardware components of the device(s) described herein, for example, to train one or more systems or models. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of example method 1200 can be performed additionally, or alternatively, by other systems.

At 1202, example method 1200 can include obtaining a training instance. A set of training data can include a plurality of training instances divided between multiple datasets (e.g., a training dataset, a validation dataset, or testing dataset). A training instance can be labeled or unlabeled. Although referred to in example method 1200 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1204, example method 1200 can include processing, using one or more machine-learned models, the training instance to generate an output. The output can be directly obtained from the one or more machine-learned models or can be a downstream result of a chain of processing operations that includes an output of the one or more machine-learned models.

At 1206, example method 1200 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1208, example method 1200 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1200 can include implementing a number of generalization techniques (e.g., weight decays, dropouts, etc.) to improve the generalization capability of the models being trained.

In some implementations, example method 1200 can be implemented for training a machine-learned model from an initialized state to a fully trained state (e.g., when the model exhibits a desired performance profile, such as based on accuracy, precision, recall, etc.).

In some implementations, example method 1200 can be implemented for particular stages of a training procedure. For instance, in some implementations, example method 1200 can be implemented for pre-training a machine-learned model. Pre-training can include, for instance, large-scale training over potentially noisy data to achieve a broad base of performance levels across a variety of tasks/data types. In some implementations, example method 1200 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Figure 13:
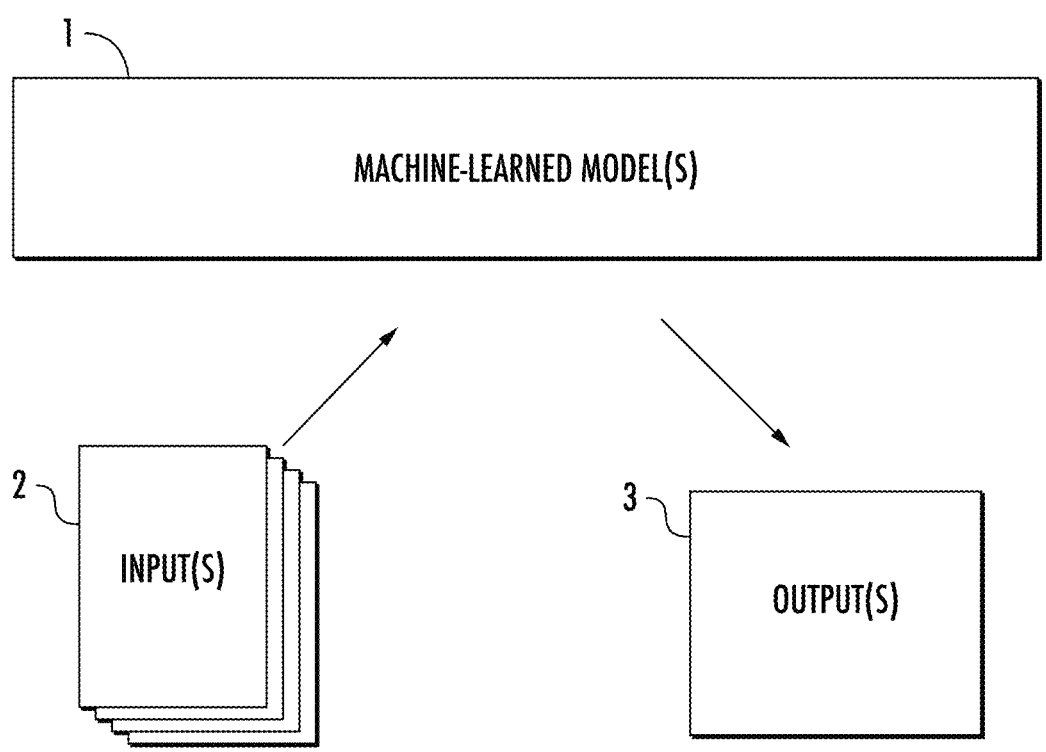
FIG. 13 depicts a block diagram of an example processing flow for using machine-learned model(s) to process input(s) to generate output(s) according to example implementations of aspects of the present disclosure.

FIG. 13 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Choice Routing*, ARXIV: 2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audio-visual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Figure 14:
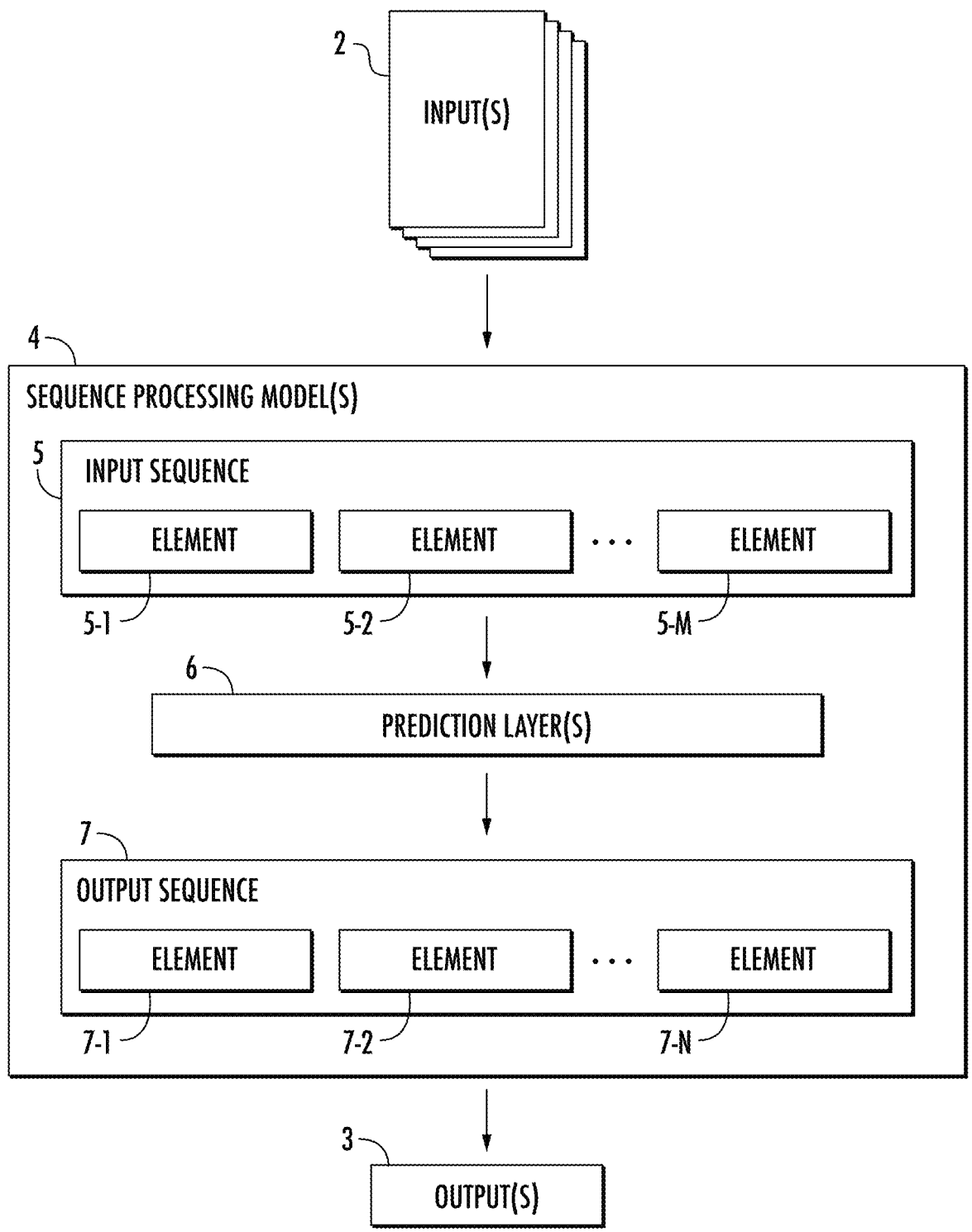
FIG. 14 depicts a block diagram of an example sequence processing model according to example implementations of aspects of the present disclosure.

FIG. 14 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, GOOGLE, https://ai.google/static/documents/palm2techreport.pdf (n.d.). Other example sequence processing models can operate in other domains, such as image domains, see, e.g., Dosovitskiy et al., *An Image is Worth 16×16 Words: Transformers for Image Recognition at Scale*, ARXIV: 2010.11929v2 (Jun. 3, 2021), audio domains, see, e.g., Agostinelli et al., *MusicLM: Generating Music From Text*, ARXIV: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, PROCEEDINGS OF THE 2018 CONFERENCE ON EMPIRICAL METHODS IN NATURAL LANGUAGE PROCESSING (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 14 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of _____." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 4. See, e.g., Vaswani et al., *Attention Is All You Need*, ARXIV: 1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multi-layer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, ARXIV: 2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 15:
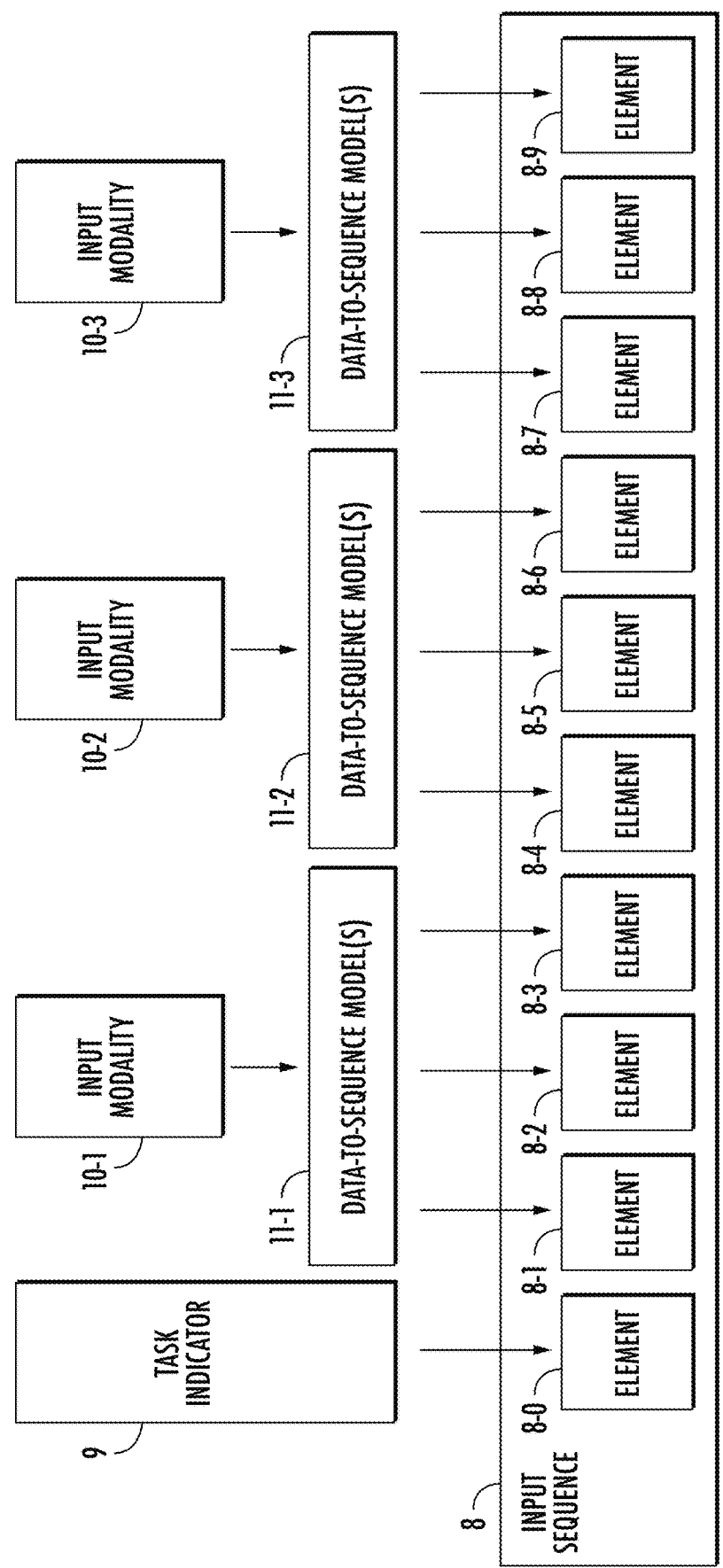
FIG. 15 depicts a block diagram of an example technique for populating an example input sequence for processing by a sequence processing model according to example implementations of aspects of the present disclosure.

FIG. 15 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned embedding within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Figure 16:
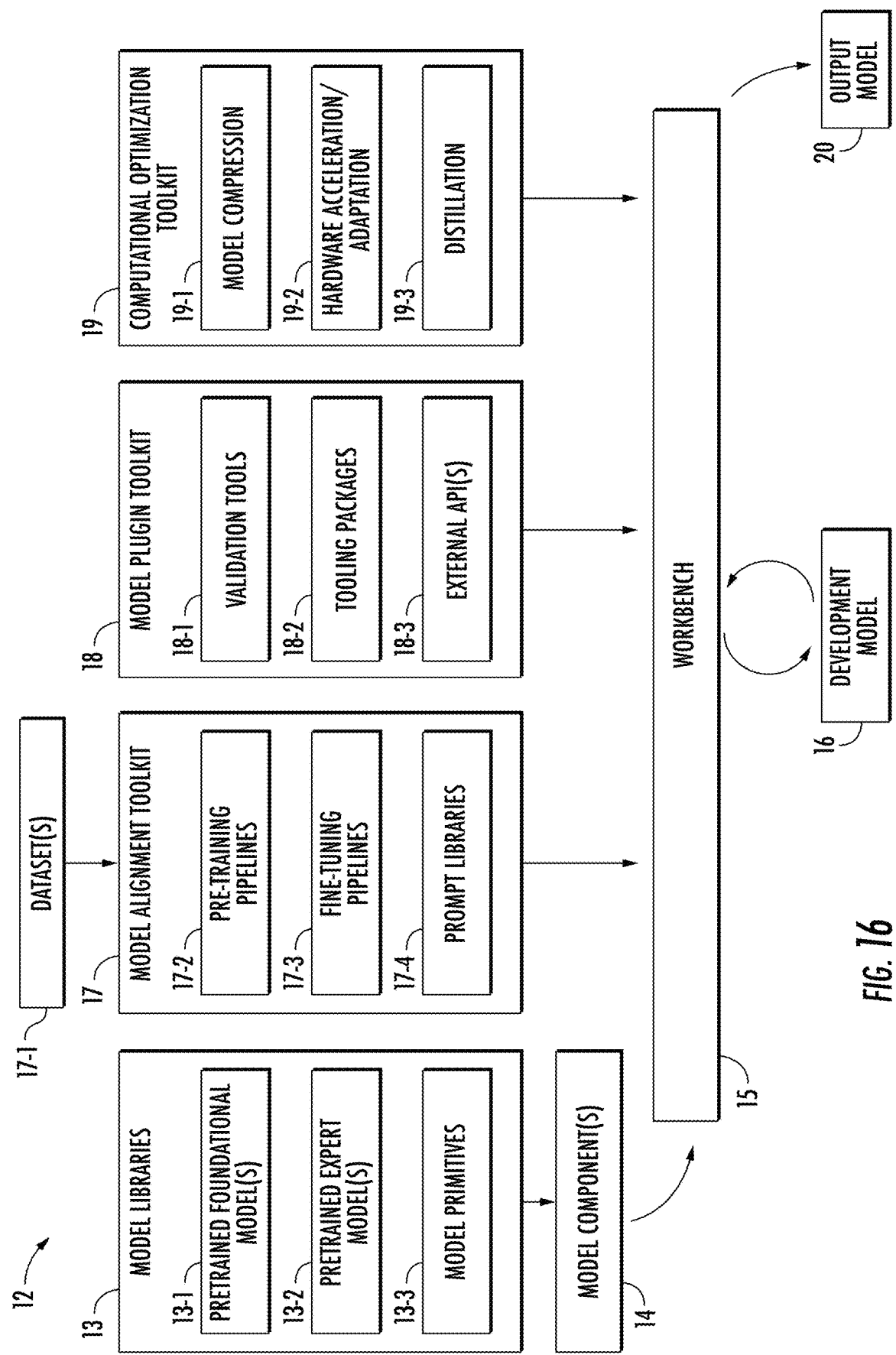
FIG. 16 depicts a block diagram of an example model development platform according to example implementations of aspects of the present disclosure.

FIG. 16 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based on one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output an input for a second model to process in order to perform a step of the task. The second model can be the same as or different from the first model. Workbench 15 can implement prompt generation pipelines in development model 16.

Prompt libraries 17-4 can include pipelines for context injection. For instance, a performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1200 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instructions that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 17:
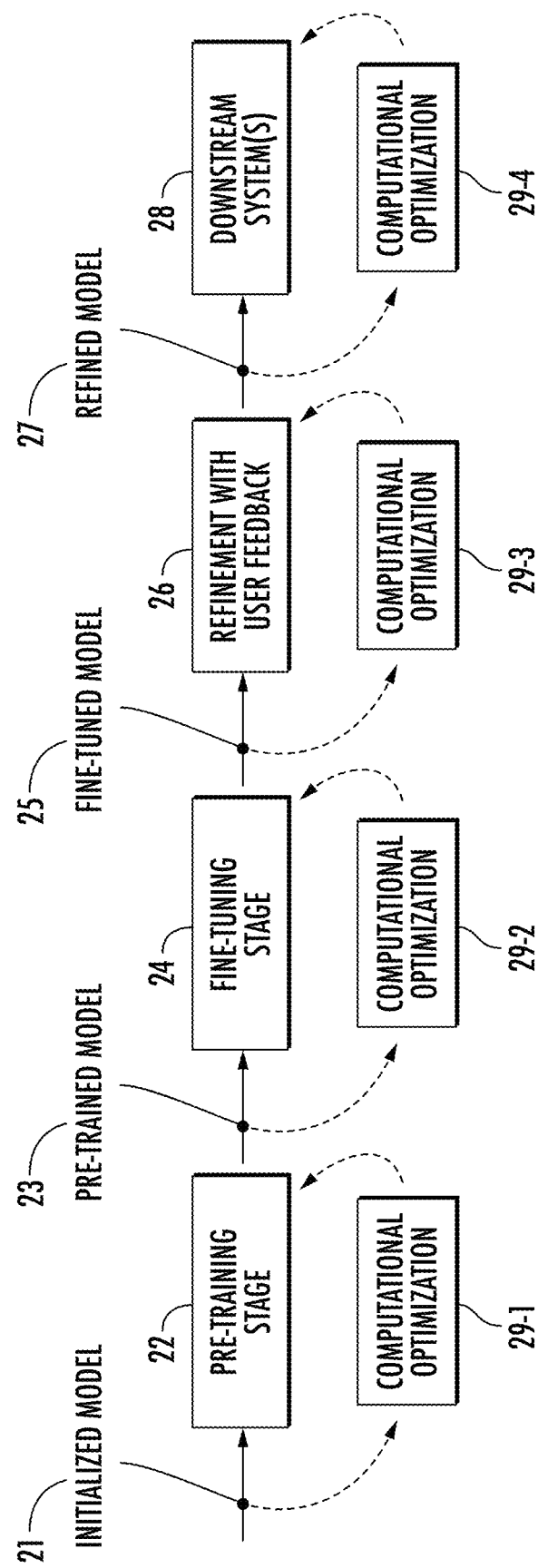
FIG. 17 depicts a block diagram of an example training workflow for training a machine-learned model according to example implementations of aspects of the present disclosure.

FIG. 17 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 17 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 17 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model as satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2 (e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Figure 18:
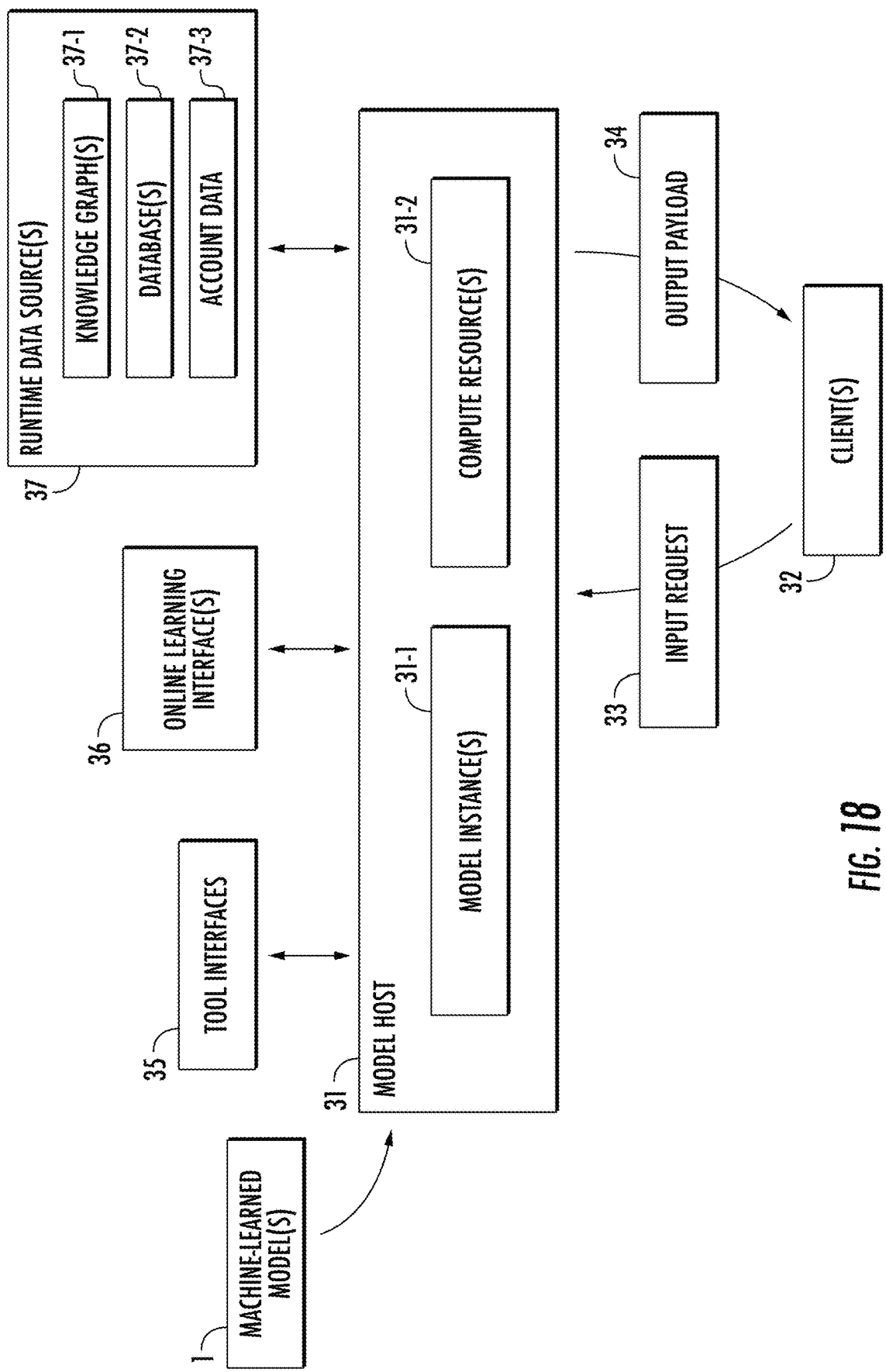
FIG. 18 depicts a block diagram of an inference system for operating one or more machine-learned model(s) to perform inference according to example implementations of aspects of the present disclosure.

FIG. 18 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) 2 can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shared model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLHF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s) 1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Figure 19:
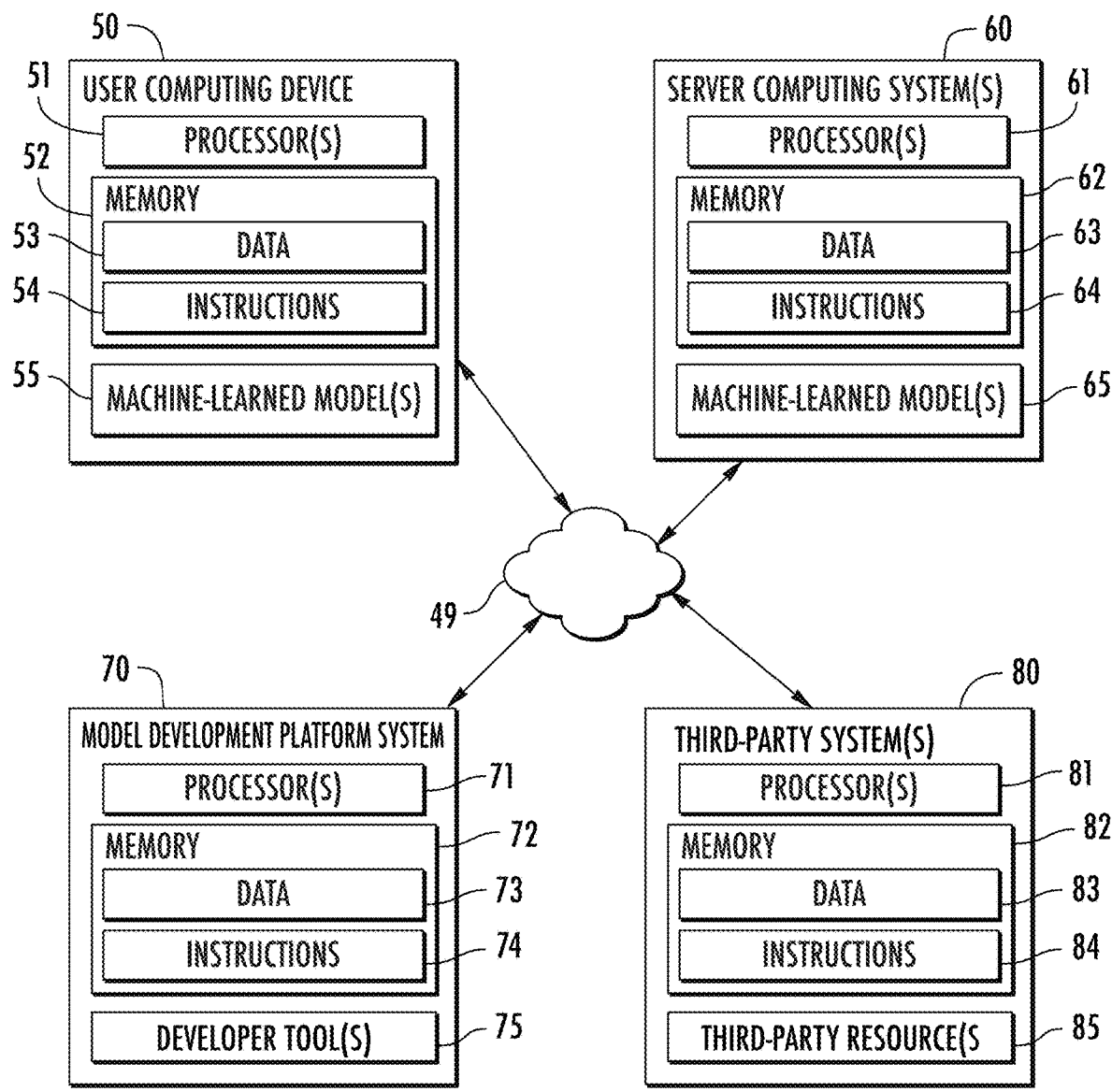
FIG. 19 depicts a block diagram of an example networked computing system according to example implementations of aspects of the present disclosure.

FIG. 19 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 19 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor(s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 19 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 20:
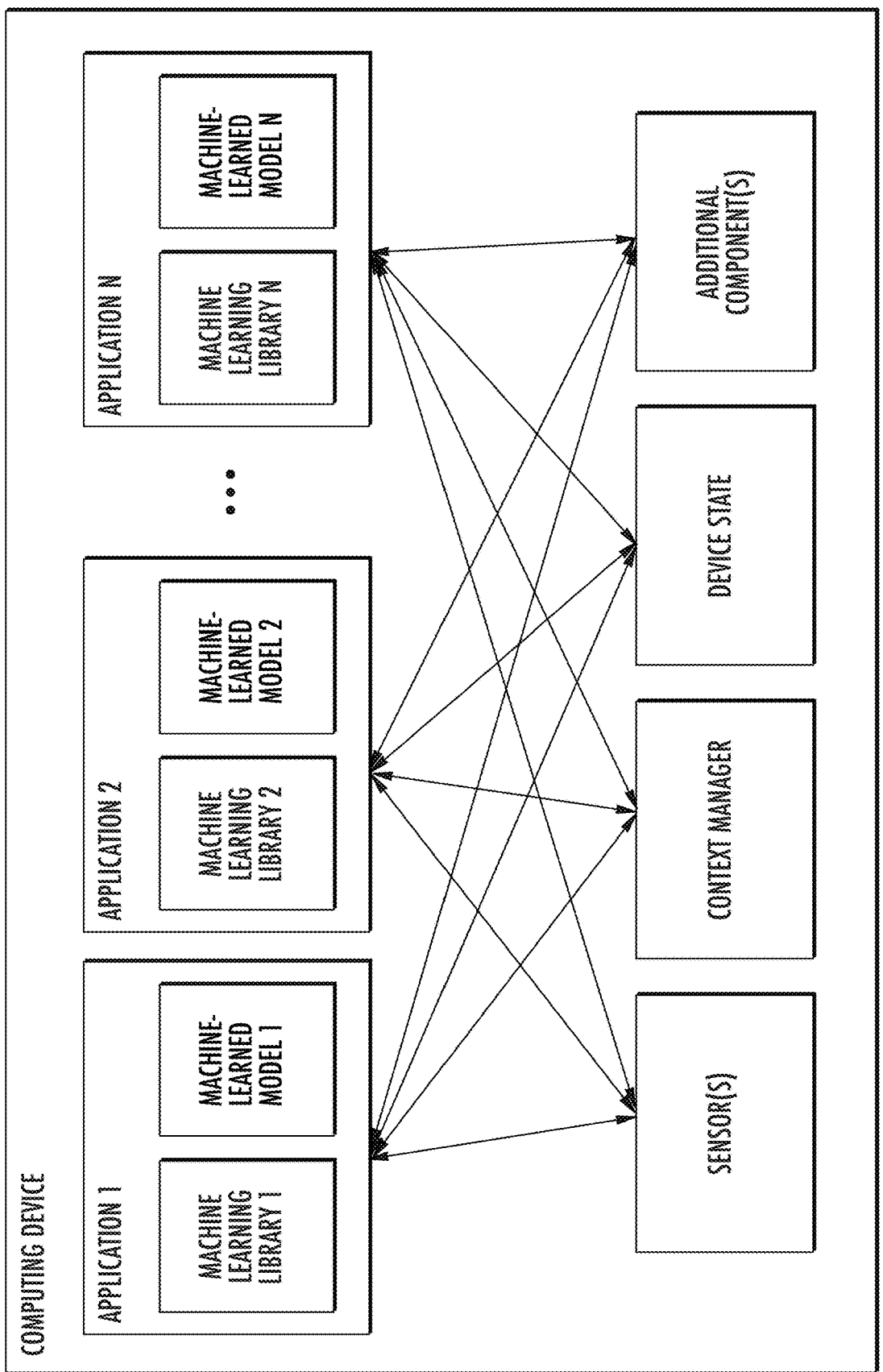
FIG. 20 depicts a block diagram of an example computing device according to example implementations of aspects of the present disclosure.

FIG. 20 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 20, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 21:
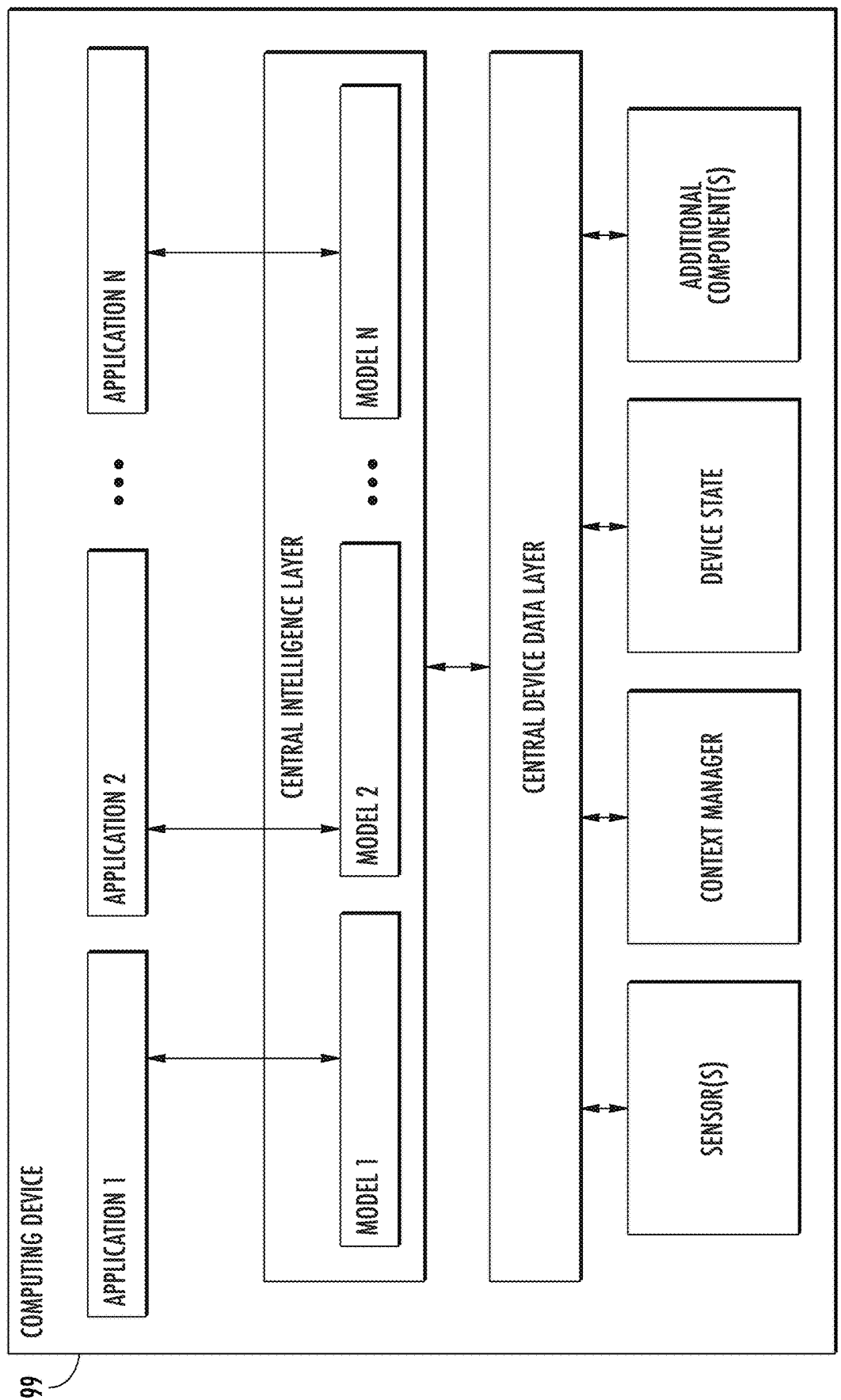
FIG. 21 depicts a block diagram of an example computing device according to example implementations of aspects of the present disclosure.

FIG. 21 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 21, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 21, the central device data layer can communicate with a number of other components of the computing device, such as, for example, one or more sensors, a context manager, a device state component, or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computing system for image search, the system comprising:
   one or more processors; and
   one or more non-transitory computer-readable media that collectively store instructions that, when executed by the one or more processors, cause the computing system to perform operations, the operations comprising:
      obtaining a search query, wherein the search query comprises one or more inputs requesting image data comprising one or more particular feature sets;
      determining a plurality of candidate image search results based on the search query;

processing the search query with a generative model to generate a plurality of search result criteria, wherein the generative model comprises a router model trained to interact with external tools and determine a next task in performing search query response processing;

processing, for at least a subset of the plurality of candidate image search results and based on a tool call generated with the router model of the generative model, a respective candidate image search result of the plurality of candidate image search results to determine a plurality of scores associated with the plurality of search result criteria;

determining a plurality of respective search result rankings of the plurality of candidate image search results based on each of the plurality of scores; and in response to determining the plurality of respective search result rankings of the plurality of candidate image search results based on each of the plurality of scores, providing a refined image search results list for display.

2. The system of claim 1, wherein determining the plurality of candidate image search results based on the search query comprises:

processing the search query with an embedding model to generate a query embedding; and determining the plurality of candidate image search results based on a plurality of embedding space distances between the query embedding and a plurality of image embeddings.

3. The system of claim 1, wherein the plurality of search result criteria comprises a set of objects that are determined to be requested based on the generative model processing the search query.

4. The system of claim 1, wherein determining the plurality of candidate image search results based on the search query comprises:

processing the search query to generate a plurality of short-form queries; and determining a plurality of candidate image result sets based on searching each of the plurality of short-form queries.

5. The system of claim 1, wherein determining the plurality of candidate image search results based on the search query comprises:

processing the search query with the generative model to generate a narrative output descriptive of a scenario in which the one or more particular feature sets would be present, wherein the narrative output comprises one or more complete natural language sentences, and wherein the generative model comprises a multimodal generative model configured to process multimodal data; and processing the narrative output with a search engine to determine the plurality of candidate image search results.

6. The system of claim 1, wherein processing, for at least the subset of the plurality of candidate image search results, the respective candidate image search result of the plurality of candidate image search results to determine the plurality of scores associated with the plurality of search result criteria comprises:

processing the plurality of candidate image search results with an auto-rater configured for low-latency rating, wherein the auto-rater performs a plurality of binary classifications with one or more classifiers, then evaluates the respective candidate image search result based on the plurality of binary classifications.

7. The system of claim 1, wherein processing the search query with the generative model to generate the plurality of search result criteria comprises:

processing the search query with the generative model to generate a binary criteria list descriptive of features that are requested by the search query, wherein the plurality of respective search result rankings are determined based on whether respective candidate image search results satisfy list items of the binary criteria list.

8. The system of claim 1, wherein the generative model comprises a language model trained to understand query intent, multiple languages, misspellings, and typographical errors.

9. The system of claim 1, wherein determining the plurality of candidate image search results based on the search query comprises: obtaining between 80 to 250 candidate image search results; and wherein determining the plurality of respective search result rankings of the plurality of candidate image search results based on each of the plurality of scores comprises: filtering the plurality of candidate image search results based on the plurality of scores.

10. A computer-implemented method for image search, the method comprising:

obtaining, by a computing system comprising one or more processors, a search query, wherein the search query comprises one or more inputs requesting image data comprising one or more particular objects and one or more particular actions;

determining, by the computing system and via an embedding-based search performed based on generating a query embedding with an embedding model in response to processing the search query, a plurality of candidate image search results and a plurality of respective search result rankings based on the search query;

processing, by the computing system, the search query with a generative model to generate a plurality of search result criteria, wherein the generative model comprises an autoregressive language model, wherein the plurality of search result criteria is descriptive of the one or more particular objects and the one or more particular actions;

for at least a subset of the plurality of candidate image search results:

processing, by the computing system and based on the plurality of search result criteria and based on a tool call generated with a router model of the generative model, a respective candidate image search result of the plurality of candidate image search results with one or more machine-learned classification models to perform a plurality of classifications associated with the plurality of search result criteria;

adjusting, by the computing system and with an auto-rater configured for low-latency rating, the plurality of respective search result rankings of the plurality of candidate image search results based on each of the plurality of classifications; and in response to adjusting the plurality of respective search result rankings of the plurality of candidate image search results based on each of the plurality of classifications, providing, by the computing system, a refined image search results list for display, wherein the refined image search results list comprises a set of image search results that comprise classifications descriptive of the plurality of search result criteria being met.

11. The method of claim 10, wherein the plurality of search result criteria comprises a set of binary logic strings.

12. The method of claim 10, wherein the plurality of respective search result rankings are determined based at least in part on historical click data associated with respective results of the plurality of candidate image search results when previous queries associated with similar topics is received.

13. The method of claim 10, wherein the generative model was tuned on ground truth satisfactory labels provided during feedback training loops.

14. The method of claim 10, wherein processing, by the computing system, the search query with the generative model to generate the plurality of search result criteria comprises:
processing, by the computing system, the search query with the generative model to generate a model-generated ranking rubric for evaluating the plurality of candidate image search results.

15. The method of claim 10, wherein the generative model is configured to generate the plurality of search result criteria and to communicate with a plurality of classification models to perform the plurality of classifications, and wherein outputs of the plurality of classifications are transmitted back to the generative model to perform rankings adjustments.

16. One or more non-transitory computer-readable media that collectively store instructions that, when executed by one or more computing devices, cause the one or more computing devices to perform operations, the operations comprising:
obtaining a search query, wherein the search query comprises one or more inputs requesting image data comprising a plurality of particular feature sets;
determining, via an embedding-based search performed based on generating a query embedding with an embedding model in response to processing the search query, a plurality of candidate image search results and a plurality of respective search result rankings based on the search query;
processing the search query, the plurality of candidate image search results, and the plurality of respective search result rankings with a generative model to determine a refined set of image search results, wherein the generative model comprises an autoregressive language model, wherein the generative model comprises an artificial intelligence agent tuned to determine a next task in a data processing instance and interact with data processing tools, wherein processing the search query, the plurality of candidate image search results, and the plurality of respective search result rankings with a generative model to determine the refined set of image search results comprises:
processing the search query with a generative model to generate a routing output comprising a plurality of search result criteria and a plurality of routing calls for interfacing with a plurality of different classification models associated with different criteria of the plurality of search result criteria;
interfacing, based on the plurality of routing calls generated with a router model of the generative model, with the plurality of different classification models to perform a plurality of classifications for each of the plurality of candidate image search results;
processing the plurality of candidate image search results, the plurality of search result criteria, and each of the plurality of classifications to generate the refined set of image search results descriptive of a subset of the plurality of candidate image search results that comprise the plurality of particular feature sets; and
providing the refined set of image search results for display in a graphical search results interface.

17. The one or more non-transitory computer-readable media of claim 16, wherein the operations further comprise:
storing the search query and the refined set of image search results as a training example; and
training an embedding model based at least in part on the training example comprising the search query and the refined set of image search results.

18. The one or more non-transitory computer-readable media of claim 16, wherein determining the plurality of candidate image search results and the plurality of respective search result rankings based on the search query comprises:
performing, based on the search query, a search of an image corpus based on metadata of a plurality of database images.

19. The one or more non-transitory computer-readable media of claim 16, wherein determining the plurality of candidate image search results and the plurality of respective search result rankings based on the search query comprises:
processing the search query with the generative model to generate a plurality of sub-task queries; and
determining the plurality of candidate image search results by processing each of the plurality of sub-task queries.

* * * * *